(12) United States Patent
Kondo et al.

(10) Patent No.: US 11,480,697 B2
(45) Date of Patent: Oct. 25, 2022

(54) EARTHQUAKE PREDICTION METHOD AND EARTHQUAKE PREDICTION SYSTEM

(71) Applicants: GENESIS RESEARCH INSTITUTE, INC., Nagoya (JP); TOYOTA JIDOSHA KABUSHIKI KAISHA, Toyota (JP); SHINSHU UNIVERSITY, Matsumoto (JP)

(72) Inventors: Hitoshi Kondo, Nagoya (JP); Yuji Enomoto, Ueda (JP)

(73) Assignees: Genesis Research Institute, Inc., Nagoya (JP); Toyota Jidosha Kabushiki Kaisha, Toyota (JP); Shinshu University, Nagano (JP)

( * ) Notice: Subject to any disclaimer, the term of this patent is extended or adjusted under 35 U.S.C. 154(b) by 325 days.

(21) Appl. No.: 16/847,990

(22) Filed: Apr. 14, 2020

(65) Prior Publication Data
US 2020/0333486 A1    Oct. 22, 2020

(30) Foreign Application Priority Data

Apr. 22, 2019  (JP) .............................. JP2019-080945

(51) Int. Cl.
*G01V 1/00* (2006.01)
(52) U.S. Cl.
CPC .................... *G01V 1/008* (2013.01)
(58) Field of Classification Search
None
See application file for complete search history.

(56) References Cited

U.S. PATENT DOCUMENTS

| 4,612,506 A | * | 9/1986 | Varotsos ................ G01V 1/008 |
| | | | 324/348 |
| 4,656,595 A | * | 4/1987 | Hognestad ............. G01N 27/20 |
| | | | 73/768 |
| 5,387,869 A | | 2/1995 | Enomoto |
| 2006/0152223 A1 | * | 7/2006 | Parenti .................. G01V 1/008 |
| | | | 324/348 |

FOREIGN PATENT DOCUMENTS

| DE | WO9009582 A1 * | 8/1990 | ............... G01N 3/34 |
| JP | H0617816 B2 * | 3/1990 | |
| JP | 5-232243 | 9/1993 | |
| JP | 2006-046938 | 2/2006 | |
| JP | 2016-028253 | 2/2016 | |

OTHER PUBLICATIONS

WO9009582A1, translation (Year: 1990).*

(Continued)

*Primary Examiner* — Lina M Cordero
(74) *Attorney, Agent, or Firm* — Finnegan, Henderson, Farabow, Garrett & Dunner, LLP

(57) ABSTRACT

A plurality of electrochemical corrosion protection systems (30) for underground buried structure installed geographically dispersed are utilized so as to predict an earthquake. Changes in amounts of current flowing through closed loop electric circuits (W) for electrochemical corrosion protection in the electrochemical corrosion protection systems (30) are detected and an earthquake is predicted based on the detected changes in the amounts of current.

3 Claims, 16 Drawing Sheets

(56) References Cited

OTHER PUBLICATIONS

JPH0617816B2, translation (Year: 1990).*
Orihara, Yoshiaki et al., Preseismic anomalous telluric current signals observed in Kozu-shima Island, Japan, PNAS, Nov. 20, 2012, vol. 109, No. 47, pp. 19125-19128.
Varotsos, P. et al., Physical properties of the variations of the electric field of the earth preceding earthquakes, III, Tectonophysics, Feb. 3, 1987, vol. 136, pp. 335-339.
Enomoto, Yuji, Coupled interaction of earthquake nucleation with deep Earth gases: a possible mechanism for seismo-electromagnetic phenomena, Geophysical Journal International, 2012, vol. 191, pp. 1210-1214.
Enomoto, Yuji et al., Anomalous geoelectric signals possibly related to the 2000 Mt. Usu eruption and 2003 Tokachi-Oki earthquakes, Physics and Chemistry of the Earth, 2006, vol. 31, pp. 319-324.
Varotsos, P. et al., Physical Properties of the Variations of the Electric Field of the Earth Preceding Earthquakes, I, Tectonophysics, 1984, vol. 110, pp. 73-98.
Varotsos, P. et al., Physical Properties of the Variations of the Electric Field of the Earth Preceding Earthquakes, II, Determination of Epicenter and Magnitude, Tectonophysics, 1984, vol. 110, pp. 99-125.

* cited by examiner

EARTHQUAKE PREDICTION METHOD AND EARTHQUAKE PREDICTION SYSTEM

FIELD

The present invention relates to an earthquake prediction method and an earthquake prediction system.

BACKGROUND

If a quasi-static fracture occurs at some location of an earthquake zone in the Earth's crust, a phenomenon of emission of a fracture-induced charge will arise during a precursor period of the earthquake. If placing detection electrodes in the ground and placing second electrodes at the ground surface or in the ground near the ground surface, while the reason is not necessarily clear, in actuality a telluric current will flow between the detection electrodes and the second electrodes. Therefore, known in the art is a telluric current detection device configured for placing a detection electrode deep into the Earth's crust so that manmade noise at the ground surface does not affect the detection results (see Japanese Unexamined Patent Publication No. 5-232243).

Therefore, if using this telluric current detection device, prediction of an earthquake becomes possible. In this regard, however, to predict an earthquake, it is necessary to set up a large number of these ground current detection devices geographically dispersed. However, such telluric current detection devices are expensive, and accordingly. as a practical problem, it is difficult to install a large number of such telluric current detection devices.

SUMMARY

Therefore, the inventors took note of on-shore earthquakes that may cause serious damage and started studies from analysis of the changes in the electromagnetic field in the crust at the time of an earthquake. As a result, based on the results of experiments, they concluded that in an on-shore earthquake which occurs due to fracture of a rock layer deep in the ground, if the rock starts fracturing, a negative charge aggregate layer will be formed due to coupling interaction of fracturing rocks with deep Earth's gases at the ground surface side surface of the fracturing rock layer deep in the ground and that due to the formation of this negative charge aggregate layer, a positive charge aggregate layer will be formed near the ground surface (Yuji Enomoto, Coupled interaction of earthquake nucleation with deep Earth gases: a possible mechanism for seismo-electromagnetic phenomena, Geophyical Journal International, vol. 191 (2012) 1210-1214). If in this way a positive charge aggregate layer is formed near the ground surface, this positive charge aggregate layer will become higher in electric potential, and thus current will flow from the high potential positive charge aggregate layer toward the low potential surroundings of the positive charge aggregate layer through the ground near the ground surface. As a result, if there is an electroconductive underground buried object, this current will flow within the electroconductive underground buried object.

Here, the inventors took note of an electrochemical corrosion protection system for galvanic corrosion of an underground buried electro-conductive structure. This is because the electrochemical corrosion protection system is provided with a closed loop electric circuit for electrochemical corrosion protection and it is considered that, if in the above-mentioned way a current flows from the positive charge aggregate layer toward the surroundings of the positive charge aggregate layer, the induced electric field generated inside the closed loop electric circuit for electrochemical corrosion protection will cause the current flowing through the closed loop electric circuit to change. Further, a large number of electrochemical corrosion protection systems are already installed dispersed geographically. Furthermore, the electrochemical corrosion protection systems are already formed with closed loop electric circuits able to grasp, as the changes in the currents (or the potential) changes in the electromagnetic field inside of the Earth's crust at the time of quasi-static fracture of a rock layer, so the inventors concluded that for predicting earthquakes, it would be advantageous to use these existing electrochemical (or galvanic) corrosion protection systems to detect anomalous precursor signals due to coupling interaction of quasi-static fracturing rocks with deep Earth gases.

Therefore, according to a first aspect of the invention, there is provided an earthquake prediction method for predicting an earthquake by utilizing a plurality of electrochemical corrosion protection systems for underground buried structure installed geographically dispersed, the method comprising:

detecting changes in amounts of current flowing through closed loop electric circuits for electrochemical corrosion protection in the electrochemical corrosion protection systems and predicting an earthquake based on detected changes in the amounts of anomalous currents due to pre-seismic activity.

Further, according to a second aspect of the invention, there is provided an earthquake prediction system for predicting an earthquake by utilizing a plurality of electrochemical corrosion protection systems for underground buried structure installed geographically dispersed, the earthquake prediction system comprising:

monitoring devices monitoring changes in amounts of current flowing through closed loop electric circuits for electrochemical corrosion protection in the electrochemical corrosion protection systems, information storage devices collecting and storing information relating to changes in the amounts of currents monitored by the monitoring devices and positional information of the monitoring devices, information processing devices statistically processing the stored information and outputting information relating to earthquake prediction, and earthquake information transmitting devices transmitting the information relating to the output earthquake prediction.

Existing electrochemical corrosion protection systems can be utilized, so earthquake prediction becomes possible by a low cost burden.

DESCRIPTION OF EMBODIMENTS

Figure 1:
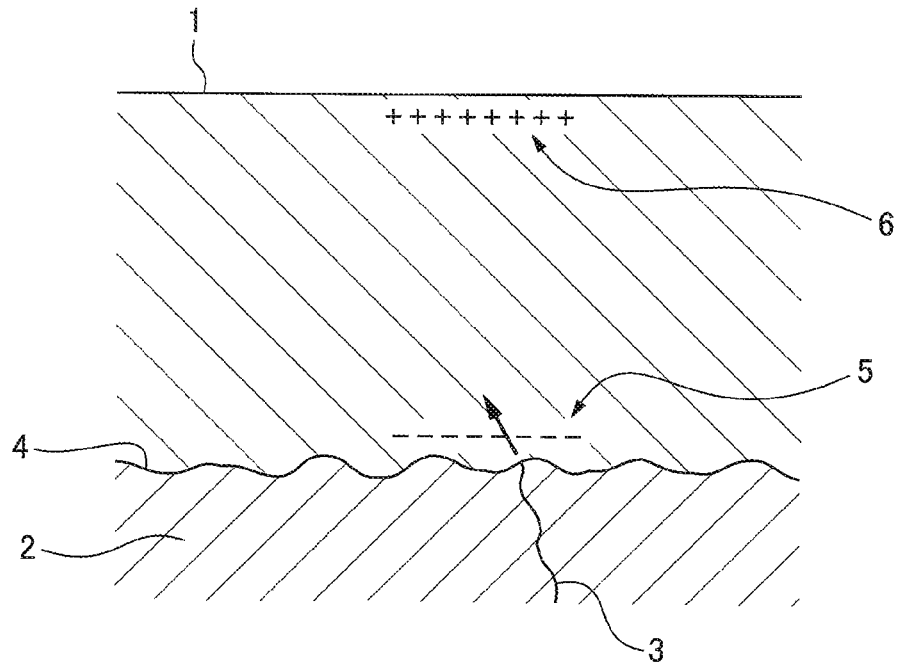
FIG. 1 is a view schematically showing the inside of the Earth's crust.
Figure 2A:
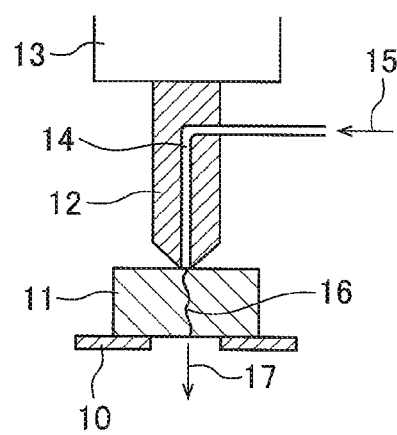
FIG. 2A and FIG. 2B are views schematically showing an experimental method demonstrating changes in the electromagnetic field inside the Earth's crust due to coupling interaction of quasi-static fracturing rock with deep Earth gases.
Figure 2B:
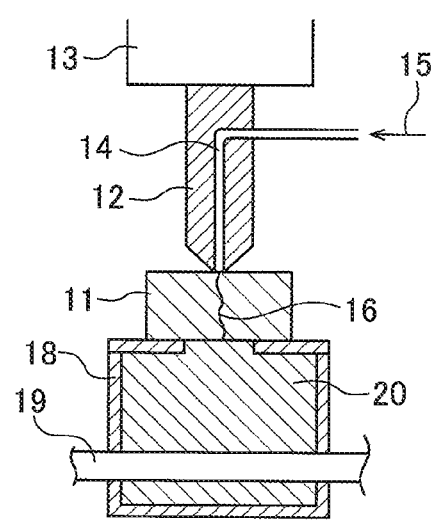

First, referring to FIG. 1, FIG. 2A, and FIG. 2B, the changes in an electromagnetic field inside the Earth' crust due to coupling interaction of quasi-static fracturing rocks with deep Earth gases at the precursor period of an on-shore earthquake will be explained. FIG. 1 is a view schematically showing the inside of the Earth's crust, while FIG. 2A and FIG. 2B schematically show a method of experiments demonstrating changes in the electromagnetic field inside the Earth's crust due to quasi-static fracturing rock with deep Earth gases. Referring to FIG. 1, 1 shows a ground surface, while 2 shows a hardened rock layer with collapsed water-bearing pores present at a depth of ~10 kilometers or more deep from the ground surface. If plate movement causes a shear force to act inside the rock layer 2, the rock will fracture quasi-statically and a fine crack 3 will form inside the rock layer 2. At this time, fracto-emission of electrons will be released from the newly created fracture plane of the rock. Then the negative charge accumulates on the crack front of the rock. That is, a quasi-static fracture process will proceed until final rupture, i.e. earthquake.

On the other hand, when the crack 3 is newly formed, deep Earth gases such as carbon dioxide, methane etc. will flow within the crack 3. At this time, the negative charge accumulated on the fracture plane of the rock will electrify to the deep Earth gases. This deep Earth gases with the negative charge will slowly rise inside the crack 3, then, as shown by the arrow mark, flow out from the crack 3 and stagnate at the surface 4 of the rock layer 2 at the ground surface side. Next, if the number of fine cracks 3 gradually increase, the amount of deep Earth gas flowing out from the cracks 3 will increase. As a result, as shown in FIG. 1, a negative charge aggregate layer 5 will be formed at the surface 4 of the rock layer 2 at the ground surface side deep in the ground. If in this way a negative charge aggregate layer 5 is formed at the surface 4 of the rock layer 2 at the ground surface side, due to this negative charge, a positive charge will be electrostatically induced near the ground surface 1. As a result, a positive charge aggregate layer 6 will be formed near the ground surface 1.

Next, referring to FIG. 2A and FIG. 2B, experiments performed for demonstrating the changes due to quasi-static fracture of rock in the electromagnetic field inside the Earth's crust will be explained. In FIG. 2A. 10 shows a support table, 11 shows a test rock placed on the support table 10, 12 shows a jig, and 13 shows a load cell. Inside of the jig 12, a test gas (carbon dioxide) flow hole 14 is formed. In this flow hole 14, as shown by the arrow mark 15, high pressure carbon dioxide gas is supplied. If the jig 12 is pressed against the test rock 11 through the load cell 13 by using a press device, a crack 16 is opened in the test rock 11 as shown in FIG. 2A. At this time, carbon dioxide gas flows out through the inside of the crack 16 as shown by the arrow mark 17. As a result of detecting this carbon dioxide gas flowing out from this crack 16, it is confirmed that this carbon dioxide gas is given a negative charge.

On the other hand, in FIG. 2B, instead of the support table 10 shown in FIG. 2A, a container 18 is used. Below the container 18, a stainless steel pipe 19 given a plastic coating at its outer circumferential surface is inserted. Inside of the container 18, pebbles and soil are filled. In the case shown in this FIG. 2B as well, in the same way as the case shown in FIG. 2A, if using the press device to press the jig 12 against the test rock 11 through the load cell 13 and causing a crack 16 to form in the test rock 11, carbon dioxide gas flows out from this crack 16. At this time, as a result of detecting the charge given to the pipe 19, it is confirmed that the pipe 19 is given a positive charge.

From these experiments, it is believed to be demonstrated that if the fine crack 3 is formed inside the rock layer 2 deep in the ground, as shown in FIG. 1, the negative charge aggregate layer 5 is formed at the surface 4 of the rock layer 2 at the ground surface side, due to this negative charge, a positive charge is electrostatically induced near the ground surface 1, and, as a result, the positive charge aggregate layer 6 is formed near the ground surface 1. In this way, if the fine crack 3 is formed in the rock layer 2 deep in the ground, the positive charge aggregate layer 6 is formed near the ground surface 1. As a result, the potential of this positive charge aggregate layer 6 becomes higher than the potential of the surroundings of the positive charge aggregate layer 6 and a potential difference occurs between the positive charge aggregate layer 6 and the surroundings of the positive charge aggregate layer 6. Therefore, if an earthquake is foreshadowed, current will flow from the high potential positive charge aggregate layer 6 toward the low potential surroundings of the positive charge aggregate layer 6 through the ground near the ground surface.

Now then, in the ground, a large number of pipes for infrastructure such as gas pipes, water pipes and oil pipelines are buried. These large number of pipes are formed from electroconductive metal pipes, for example, stainless steel pipes. If such metal pipes are buried in the ground, the outer circumferential surfaces of the metal pipes gradually electrochemically corrode due to the formation of local cells on the outside wall surfaces of the metal pipes. If the outside wall surfaces of the metal pipes corrode, the metal pipes rapidly deteriorate, so in metal pipes buried in the ground, corrosion of the outside wall surfaces of the metal pipes becomes a major problem. Therefore, the outer circumferential surfaces of these metal pipe are usually coated with plastic to prevent corrosion, that is, for anticorrosion. Even so, it is difficult to inhibit corrosion. Therefore, from before, electrochemical corrosion protection systems have been used to prevent corrosion of metal pipes.

Figure 3:
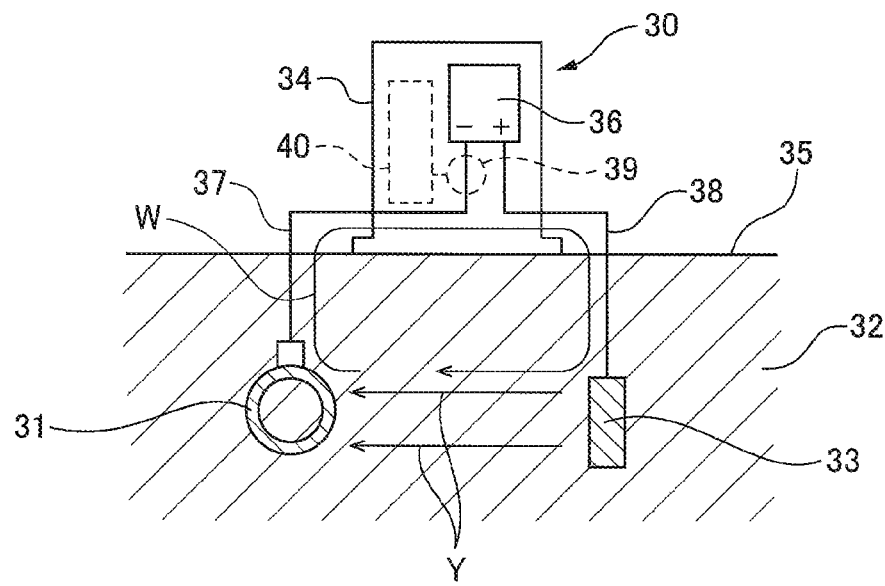
FIG. 3 is an overall view of an electrochemical corrosion protection system.

FIG. 3 schematically shows one example of an electrochemical corrosion protection system. In FIG. 3, this electrochemical corrosion protection system as a whole is shown by notation 30. Note that, in FIG. 3, 31 shows an infrastructure use metal pipe such as a gas pipe, water pipe and oil pipeline buried in the ground 32. At the outer circumferential surface of this metal pipe 31, plastic is coated for preventing corrosion. The electrochemical corrosion protection system 30 is provided with an electrode 33 comprised of, for example, cast iron, arranged separated a distance from the metal pipe 31 in the ground 32 and with an outside power supply apparatus 34 placed, for example, on the ground surface 35. This outside power supply apparatus 34 is provided with a power supply 36. A minus side terminal of the power supply 36 is connected through a lead wire 37 to the metal pipe 31, while a plus side terminal of the power supply 36 is connected through a lead wire 38 to the electrode 33.

If voltage is applied between the metal pipe 31 and the electrode 33 by the power supply 36, a fine corrosion prevention current Y flows from the electrode 33 toward the metal pipe 31. Due to the corrosion prevention current Y flowing from the electrode 33 toward the metal pipe 31 in this way, corrosion of the outside wall surface of the metal pipe 31 is inhibited. Therefore, as will be understood from FIG. 3, the electrochemical corrosion protection system 30 is formed with a closed loop electric circuit W extending from the power supply 36 through the lead wire 38, electrode 33, metal pipe 31, and lead wire 37 and again returning to the power supply 36. Note that, an electrochemical corrosion protection system using the outside power supply 36 in this way will be referred to as an "outside power supply type".

Now then, as explained above, if an earthquake is foreshadowed, the positive charge aggregate layer 6 is formed near the ground surface, and current flows through the ground from the high potential positive charge aggregate layer 6 toward the low potential surroundings of the positive charge aggregate layer 6. At this time, if the closed loop electric circuit W such as shown in FIG. 3 is formed, due to the current flowing through the inside of the ground, an electromotive force is generated inside the closed loop electric circuit W. As a result, the current flowing through the inside of the closed loop electric circuit W increases. Note that, at this time, whether the increasing current flows through the inside of the closed loop electric circuit W clockwise in FIG. 3 or flows counterclockwise is determined by which of the potentials of the electrode 33 and metal pipe 31 becomes higher when the high potential positive charge aggregate layer 6 is formed. Therefore, at this time, the direction of flow of current differs for each electrochemical corrosion protection system 30.

In this way, if an earthquake is foreshadowed, the amount of current flowing through the closed loop electric circuit W changes. Therefore, if detecting the changes in the amounts of current flowing through the inside of the closed loop electric circuit W, it becomes possible to predict an earthquake based on the detected changes in the amounts of current or potential. Note that, the underground buried structures to be corrosively protected by the electrochemical corrosion protection system 30 are not limited to metal pipes, and there are various steel structures such as bridge footings. Therefore, the present invention can also be utilized for electrochemical corrosion protection systems used for such underground buried structures. Therefore, in the present invention, by utilizing a plurality of electrochemical corrosion protection systems for underground buried structure installed dispersed geographically, the changes in the amounts of current flowing through the closed loop electric circuits for electrochemical corrosion protection in the electrochemical corrosion protection systems are detected and an earthquake is predicted based on the detected changes in the amounts of current.

In this regard, to detect the changes in amounts of current flowing through the closed loop electric circuits W, it is sufficient to place detectors 39 for detecting the amounts of current flowing through the closed loop electric circuits W, for example, ammeters, as shown in FIG. 3 by the broken line, inside the closed loop electric circuits W. In this way, in the present invention, it becomes possible to predict an earthquake by just installing ammeters 39 at existing electrochemical corrosion protection systems 30, so it becomes possible to predict an earthquake by a low cost burden. Note that, in this case, in the embodiment shown in FIG. 3, in addition to the ammeters 39, processing devices 40 for processing the detected values detected by the ammeters 39 are additionally installed in the electrochemical corrosion protection systems 30 such as shown by the broken lines. In this case as well, it becomes possible to predict an earthquake by just installing the detectors 39 and the processing devices 40 at existing electrochemical corrosion protection systems 30, so in the same way it becomes possible to predict an earthquake by a low cost burden.

Note that, changes in the amounts of current flowing through the insides of the closed loop electric circuits W can be detected in various ways. For example, the changes in the amounts of current flowing through the insides of the closed loop electric circuits W can be detected in the form of changes in voltage. In this way, the changes in the amounts of current flowing through the insides of the closed loop electric circuits W are detected in the form of various detected values representing the changes in the amounts of current flowing through the insides of the closed loop electric circuits W. Therefore, in the present invention, the detected values of the changes in the amounts of current flowing through the insides of the closed loop electric circuits W include all of the various detected values representing the changes in the amounts of currents flowing through the insides of the closed loop electric circuits W.

Figure 4:
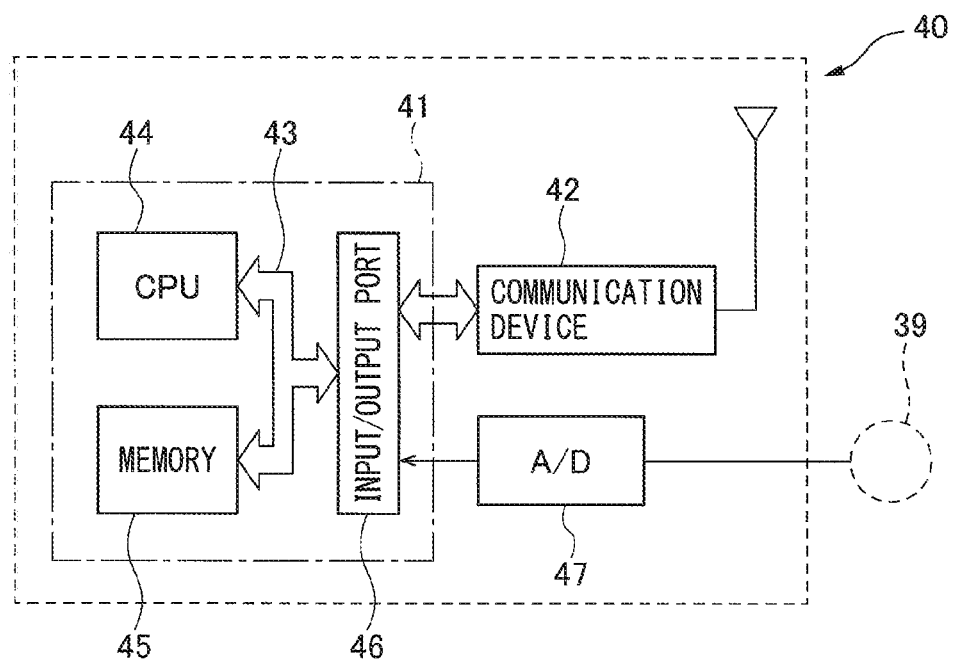
FIG. 4 is a view for explaining a processing device.

Next, the processing device 40 shown in FIG. 3 will be simply explained. FIG. 4 shows this processing device 40 and the ammeter 39. Referring to FIG. 4, the processing device 40 includes an electronic control unit 41 and a communication device 42. This electronic control unit 41 is provided with a microprocessor (CPU) 44, a storage device, that is, a memory 45, and an input/output port 46, which are connected with each other by a bidirectional bus 43. As shown in FIG. 4, the input/output port 46 is connected to the communication device 42. Further, the input/output port 46 is connected to the ammeter 39 through an AD converter 47.

Next, referring to FIG. 5, another example of the cathodic protection system 30 will be explained. Note that, in FIG. 5, components similar to FIG. 3 will be shown by the same notations and explanations will be omitted. If referring to FIG. 5, the electrochemical corrosion protection system 30 is provided with an anode 50 placed in the ground 32 separated a distance from the metal pipe 31. The anode 50 is connected through a lead wire 51 to the metal pipe 31. This anode 50 is formed from a metal with a higher ionization tendency than iron, for example, aluminum. Note that, the anode 50 is surrounded by a filler called a "backfill", for example, a mixture of plaster, bentonite, and sodium sulfate.

Figure 5:
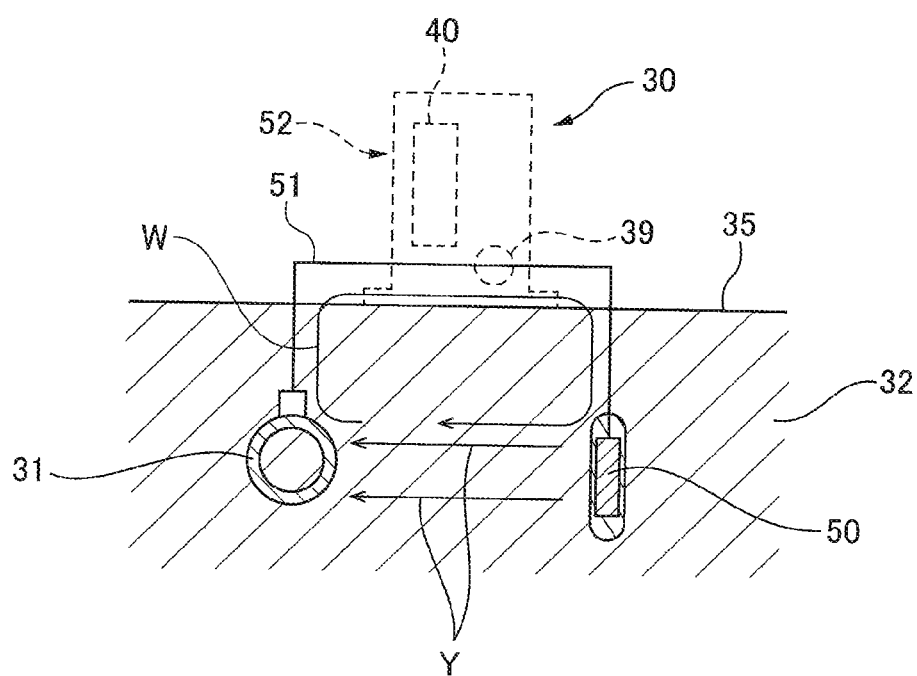
FIG. 5 is an overall view of another electrochemical corrosion protection system.

In the electrochemical corrosion protection system 30 shown in FIG. 5, due to the potential difference arising between the metal pipe 31 and the anode 50, a slight corrosion prevention current Y flows from the anode 50 toward the metal pipe 31. Due to the corrosion prevention current Y flowing from the anode 50 toward the metal pipe 31 in this way, corrosion of the outside wall surfaces of the metal pipe 31 is inhibited. In this electrochemical corrosion protection system 30 as well, as shown in FIG. 5, the electrochemical corrosion protection system 30 is formed with a closed loop electric circuit W extending from the metal pipe 31 through the lead wire 51 and anode 50 and again returning to the metal pipe 31. Note that, the electrochemical corrosion protection system utilizing the potential difference arising between the metal pipe 31 and anode 50 in this way will be referred to as the "galvanic anode system".

Now then, in the electrochemical corrosion protection system 30 shown in FIG. 5 as well, if current flows from the high potential positive charge aggregate layer 6 toward the low potential surroundings of the positive charge aggregate layer 6 in FIG. 1, an induced electromotive force is generated inside the closed loop electric circuit W. As a result, the current flowing through the closed loop electric circuit W increases. Therefore, in the cathodic protection system 30 shown in FIG. 5 as well, an earthquake can be predicted based on the changes in the amounts of current flowing through the inside of the closed loop electric circuit W. Note that, even at the electrochemical corrosion protection system 30 shown in FIG. 5, whether the increasing current flows through the inside of the closed loop electric circuit W clockwise in FIG. 5 or flows counterclockwise is determined by which of the potentials of the metal pipe 31 and anode 50 becomes higher when the high potential positive charge aggregate layer 6 is formed. Therefore, at this time, the direction of flow of current differs for each electrochemical corrosion protection system 30.

On the other hand, in the electrochemical corrosion protection system 30 shown in FIG. 5 as well, to detect changes in the amounts of current flowing through the inside of the closed loop electric circuit W, it is sufficient to place the detector 39 for detecting the amounts of current flowing through the inside of the closed loop electric circuit W, for example, an ammeter, inside the closed loop electric circuit W such as shown by the broken line in FIG. 5. Note that, in this case, in the embodiment shown in FIG. 5, a detection device 52 having the detector 39 and the processing device 40 for processing detected values detected by the detector 39 is, as shown by the broken line, additionally set in the electrochemical corrosion protection system 30. Note that, if an earthquake occurs, a high voltage is generated inside the closed loop electric circuit W due to the induced electromotive force. Therefore, as the electrochemical corrosion protection system 30, it is preferable to utilize the outside power supply type of electrochemical corrosion protection system which continues to operate while handling even voltages higher compared to the galvanic anode system.

Figure 6:
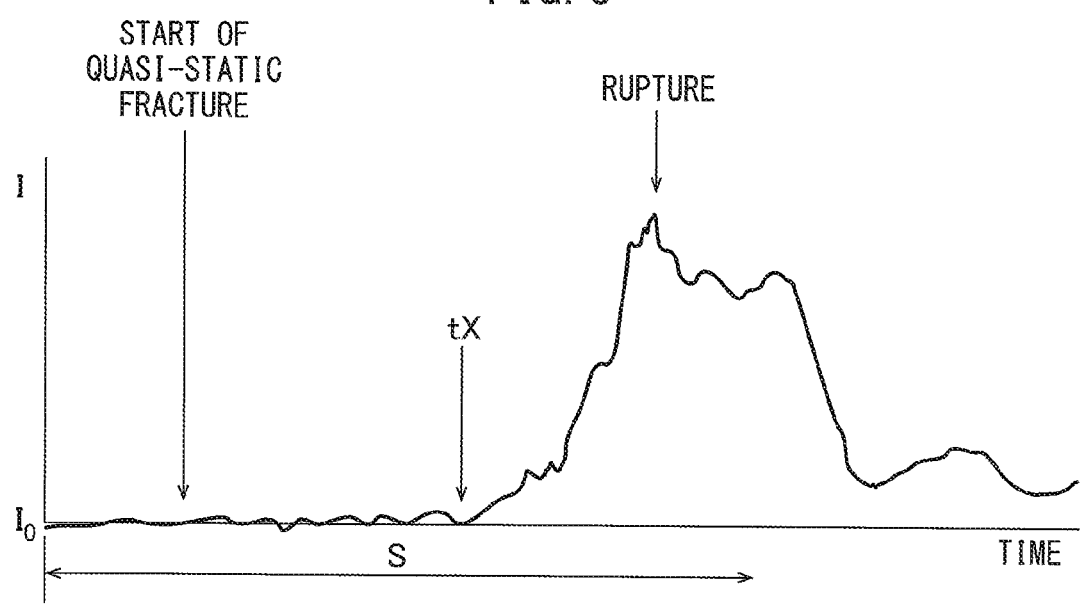
FIG. 6 is a view showing changes in amounts of current flowing through an inside of a closed loop electric circuit due to coupling interaction of quasi-static fracturing rock with deep Earth gas (carbon dioxide).

Next, referring to FIG. 6 to FIG. 9, the changes in the amounts of current flowing through the closed loop electric circuit W after the fine crack 3 starts to be formed in the rock layer 2, that is, after a quasi-static fracture is started, will be explained. Note that, FIG. 6 to FIG. 9 show the case where the corrosion prevention current Y continues to flow. First, referring to FIG. 6, the ordinate I shows the amounts of current flowing through the closed loop electric circuit W, while the abscissa shows time. Further, FIG. 6 shows when the quasi-static fracture is started and when the rock layer 2 ruptures. On the other hand, in the ground, even at an ordinary time, a slight natural current flows. $I_0$ of the ordinate I of FIG. 6 shows the value of the natural current at this ordinary time. Note that FIG. 6 shows as one example the case where the amounts of current I flowing through the closed loop electric circuit W detected by the detector 30 increase when rupture occurs.

Now then, referring to FIG. 6, before the fine crack 3 starts to be formed in the rock layer 2, that is, before the quasi-static fracture is started, the amounts of current I flowing through the closed loop electric circuit W become slight values. Next, if the fine crack 3 starts to be formed in the rock layer 2, that is, if the quasi-static fracture is started, the amounts of current I flowing through the closed loop electric circuit W first continuously fluctuate by a slight value. Near the time tX of FIG. 6, they start to rise. After that, the amounts of current I flowing through the closed loop electric circuit W rapidly rise and reach a peak at which rupture occurs. At this time, an earthquake occurs. Therefore, if able to detect the time tX when the amounts of current I flowing through the closed loop electric circuit W start to rise in FIG. 6, it would become possible to predict an earthquake. Therefore, in the embodiment according to the present invention, the time tX when the amounts of current I flowing through the closed loop electric circuit W start to rise is detected.

Figure 7:
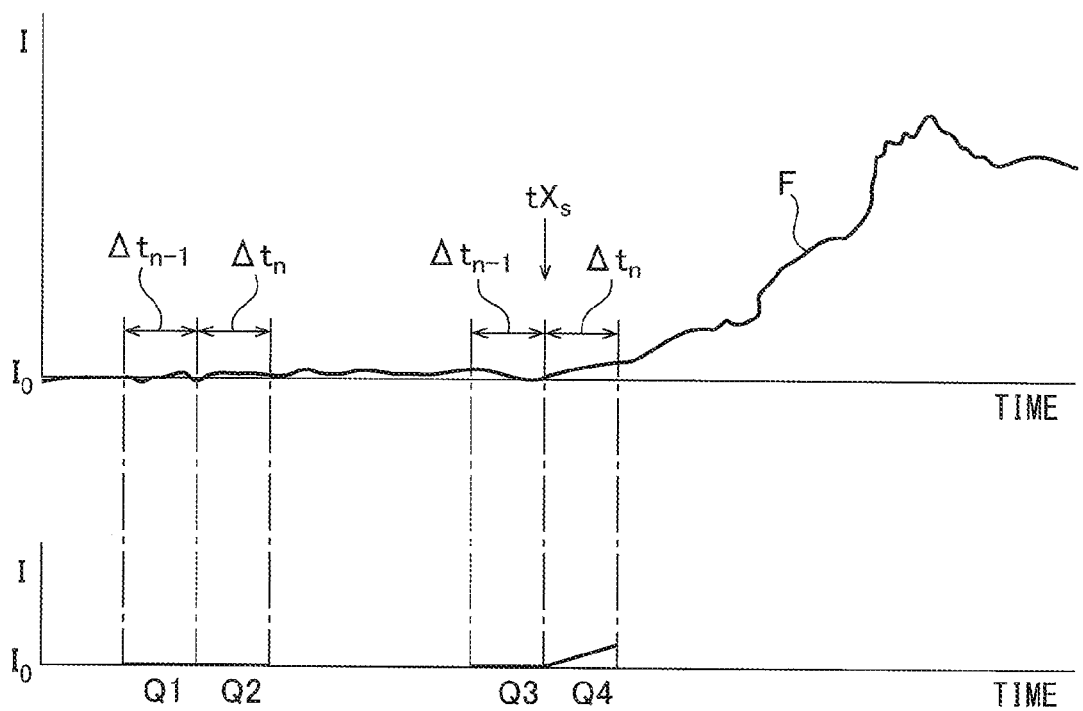
FIG. 7 is a view showing changes in amounts of current flowing through an inside of a closed loop electric circuit due to coupling interaction of quasi-static fracturing rock with deep Earth gas.
Figure 8:
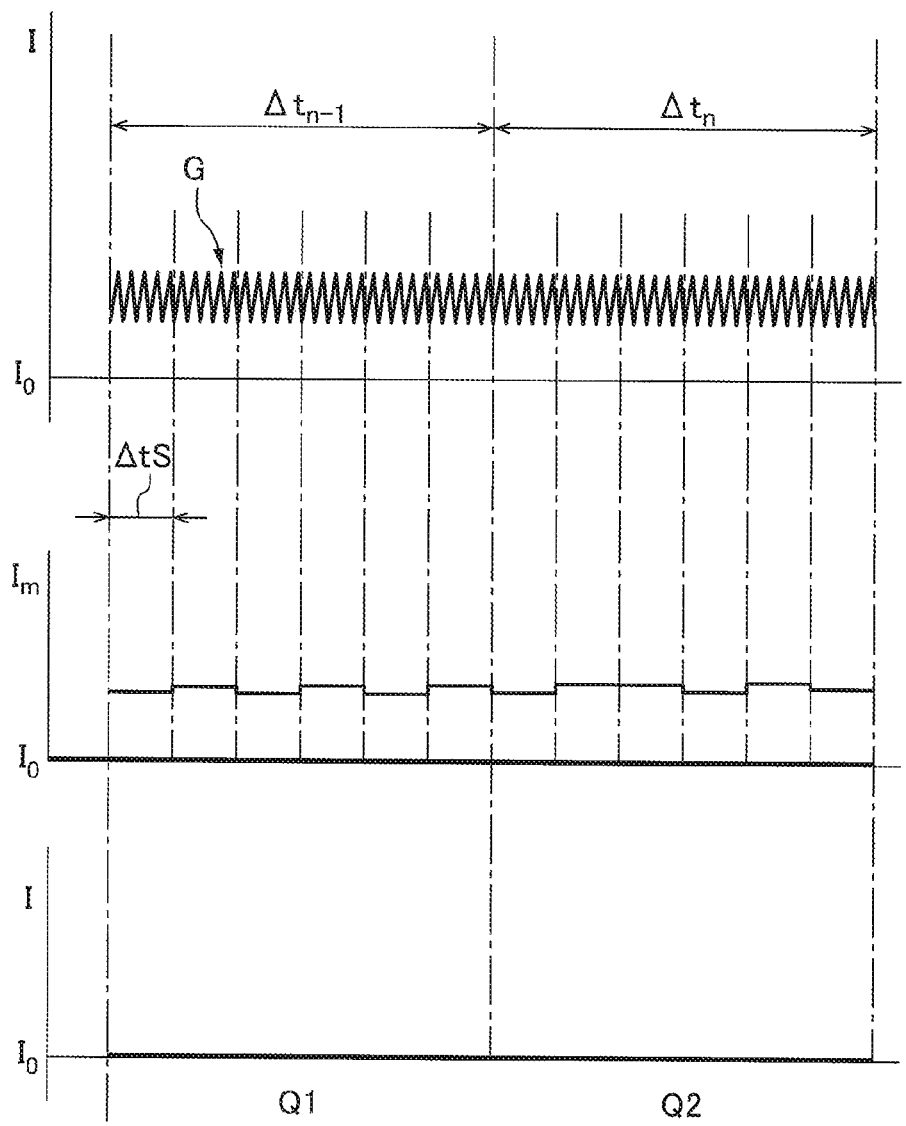
FIG. 8 is a view for explaining mean values of amounts of current flowing through an inside of a closed loop electric circuit.

FIG. 7 and FIG. 8 show the method of finding the time tX of start of rise of the amounts of current I used in embodiments of the present invention. First, referring to FIG. 7, the curve F of FIG. 7 shows the changes in the amounts of current I in the section S of FIG. 6 while stretching the time axis. Q1, Q2 and Q3, Q4 in FIG. 7 show approximation functions when approximating the changes of the amounts of current I within consecutive predetermined constant times $\Delta t_{n-1}$ and $\Delta t_n$ by linear functions, that is, show approximation straight lines. On the other hand, FIG. 8 is a detailed view of parts relating to the approximation straight lines Q1 and Q2 in FIG. 7. Note that, FIG. 8 shows the actual change G of the amounts of current I and the mean value Im of amounts of current I within a fixed time period $\Delta$ts. Giving a specific example, this fixed time period $\Delta$ts is made 10 seconds. As such a specific example, the mean value Im of the amounts of current I within 10 seconds is found. Furthermore, in this specific example, the mean value Im of the amounts of current I is calculated every 10 seconds while the fixed time periods $\Delta t_{n-1}$ and $\Delta t_n$ are made 2 minutes. Therefore, in this specific example, within the fixed time periods $\Delta t_{n-1}$ and $\Delta t_n$, six respective mean values Im of the amounts of current I are acquired. The approximation straight lines Q1, Q2, Q3, and Q4 are found from the six mean values Im of the amounts of current I acquired within the corresponding fixed time periods $\Delta t_{n-1}$ and $\Delta t_n$ using the least square method.

Now then, if defining the slopes of approximation straight lines within the fixed time period $\Delta t_{n-1}$ (in FIG. 7, Q1 and Q3) as $K_{n-1}$ and defining the slopes of approximation straight lines within the fixed time $\Delta t_n$ (in FIG. 7, Q2 and Q4) as $K_n$, before the amounts of current I increase due to an earthquake, the amounts of current I just fluctuate slightly. Therefore, as shown in FIG. 7, the slope $K_{n-1}$ of the approximation straight line Q1 becomes substantially zero, while the slope $K_n$ of the approximation straight line Q2 becomes substantially zero. Therefore, the difference $\Delta K$ ($=K_n-K_{n-1}$) between the slope $K_n$ of the approximation straight line Q2 and the slope $K_{n-1}$ of the approximation straight line Q1 also becomes substantially zero.

On the other hand, before the formation of the positive charge aggregate layer 6 causes the amounts of current I to start to increase, as will be understood from the approximation straight line Q3 of FIG. 7, the slope $K_{n-1}$ of the approximation straight line Q3 becomes substantially zero. As opposed to this, if the formation of the positive charge aggregate layer 6 causes the amounts of current I to start to increase, as will be understood from the approximation straight line Q4 of FIG. 7, the slope $K_n$ of the approximation straight line Q4 becomes larger. Therefore, at this time, the difference $\Delta K$ ($=K_n-K_{n-1}$) of the slope $K_n$ of the approximation straight line Q4 and the slope $K_{n-1}$ of the approximation straight line Q3 becomes larger. In this case, in FIG. 7, when the start time tXs of the fixed time $\Delta t_n$ spent for finding the approximation straight line Q4 matches the time tX of start of rise of the amounts of current I, the difference $\Delta K$ ($=K_n-K_{n-1}$) of the slope $K_n$ of the approximation straight line Q4 and the slope $K_{n-1}$ of the approximation straight line Q3 becomes the greatest. At this time, the difference $\Delta K$ ($=K_n-K_{n-1}$) exceeds a threshold value $\alpha$ determined from past measurement data. Therefore, in the embodiment according to the present invention, when the difference $\Delta K$ ($=K_n-K_{n-1}$) exceeds the threshold value $\alpha$, the start time tXs of the constant time $\Delta t_n$ spent for finding the approximation straight line Q4 is made the time tX of start of rise of the amounts of current I.

Figure 9:
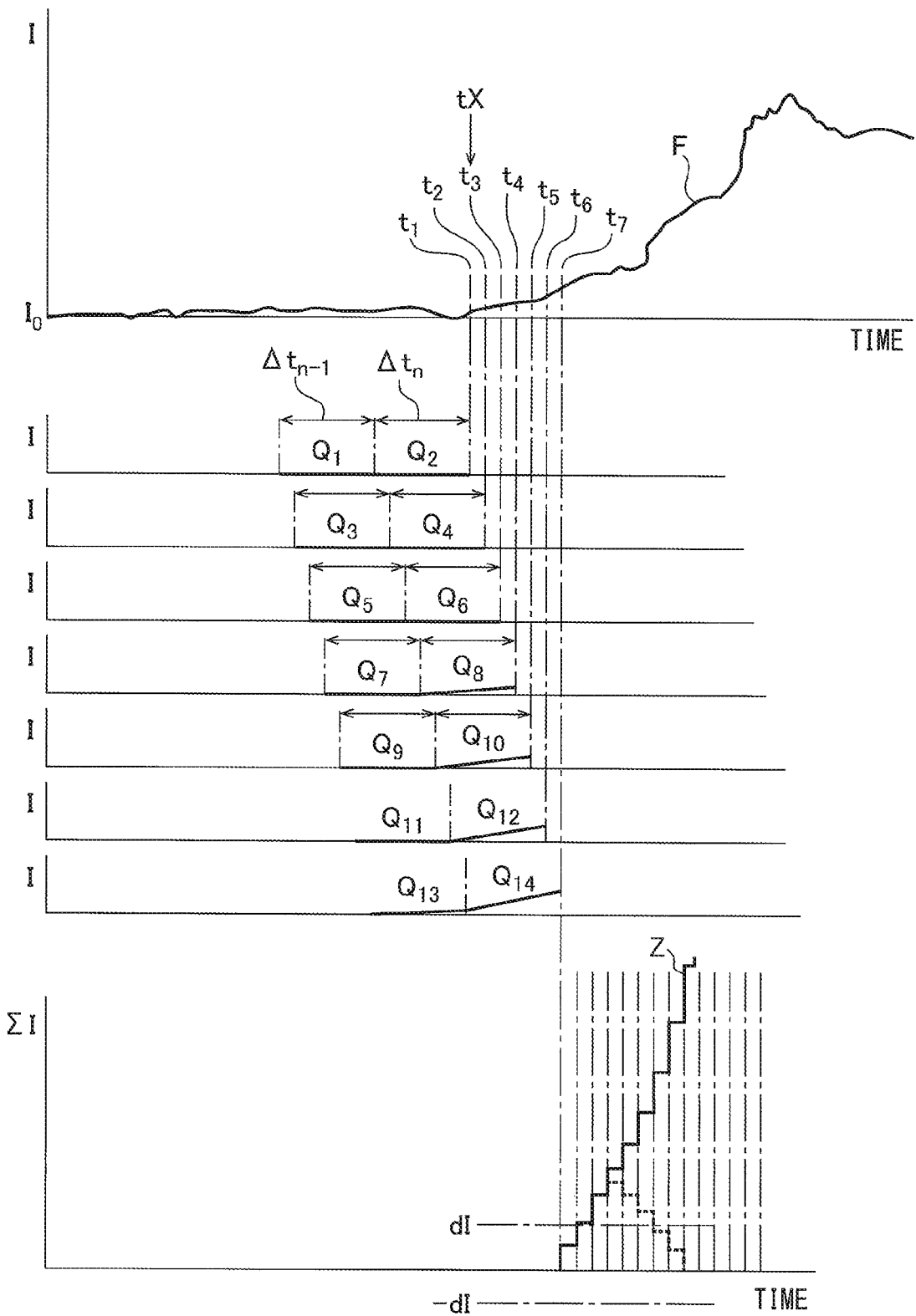
FIG. 9 is a view showing changes in amounts of current flowing through an inside of a closed loop electric circuit.

Next, referring to FIG. 9, the method of calculation of the time tX of start of rise of the amounts of current I used in the embodiments according to the present invention will be simply explained. Note that, the curve F shown in FIG. 9 is the same as the curve F shown in FIG. 7. As explained above, in the embodiment according to the present invention, for example, the mean value Im of amounts of current I flowing through the closed loop electric circuit W is acquired every 10 seconds. When the mean values Im of amounts of current I are acquired, the difference $\Delta K$ ($=K_n-K_{n-1}$) is calculated based on the mean value Im of amounts of current I in the period from when acquiring the mean value Im of amounts of current I to before the fixed time period $\Delta t_n$+fixed time period $\Delta t_{n-1}$.

That is, in FIG. 9, when the mean value Im of amounts of current I is acquired at the time $t_1$, the slope of the approximation straight line $Q_1$ and the slope of the approximation straight line $Q_2$ are found based on the mean value Im of amounts of current I in the period from when acquiring the mean value Im of amounts of current I to before the fixed time period $\Delta t_n$+fixed time period $\Delta t_{n-1}$. From these slopes, the difference $\Delta K$ ($=K_n-K_{n-1}$) is found. Next, when the mean value Im of amounts of current I is acquired at the time $t_2$, the slope of the approximation straight line $Q_3$ and the slope of the approximation straight line $Q_4$ are found based on the mean value Im of amounts of current I in the period from when acquiring the mean value Im of amounts of current I to before the fixed time period $\Delta t_n$+fixed time period $\Delta t_{n-1}$. From these slopes, the difference $\Delta K$ ($=K_n-K_{n-1}$) is calculated from these slopes. Below, the same is true for the time when the mean value Im of amounts of current I is acquired at the time $t_3$, the time when the mean value Im of amounts of current I is acquired at the time $t_4$, the time when the mean value Im of amounts of current I is acquired at the time ts, the time when the mean value Im of amounts of current I is acquired at the time $t_6$ and the time when the mean value Im of amounts of current I is acquired at the time $t_7$.

If the mean values Im of amounts of current I are acquired at the times $t_1$, $t_2$, $t_3$, $t_4$, $t_5$, $t_6$ and $t_7$ and the difference $\Delta K$ ($=K_n-K_{n-1}$) is calculated, it is judged if the difference $\Delta K$ ($=K_n-K_{n-1}$) exceeds the threshold value $\alpha$. For example, if it is judged that the difference $\Delta K$ ($=K_n-K_{n-1}$) exceeds the threshold value $\alpha$ at the time $t_7$, the time $t_1$ is made the time tX of start of rise of the amounts of current I. If the mean value Im of amounts of current I flowing through the closed loop electric circuit W starts to rise, when after that a certain time elapses, for example, 30 minutes to 40 minutes elapses, the rock layer 2 ruptures and an earthquake occurs. Therefore, if the time tX of start of rise of the mean values Im of amounts of current I is known, it becomes possible to predict an earthquake.

In this regard, after the mean values Im of amounts of current I have started to rise, if an earthquake is going to occur, the mean values Im of amounts of current I will continue to rise after that until the rupture. However, if the rise of the mean values Im of amounts of current I is not due to foreshadowing of an earthquake, sometimes a rupture will not result after the mean values Im of amounts of current I start to rise, that is, no earthquake will occur. Therefore, if predicting an earthquake just because the mean values Im of amounts of current I have started to rise, a mistaken alert will result. In this regard, if no earthquake occurs after the mean values Im of amounts of current I have started to rise, the mean values Im of amounts of current I will decrease in a short time after that. Therefore, it is possible to judge whether an earthquake will occur from the behavior of the mean values Im of amounts of current I after the mean values Im of amounts of current I have started to rise.

Therefore, in the first embodiment of the present invention, when it is judged that the mean values Im of amounts of current I have started to rise, the increases in the mean values Im of amounts of current I successively acquired from when it is judged that the mean values Im of amounts of current I have started to rise are cumulatively added to find the sum value $\Sigma I$ of the increases of the mean values Im of amounts of current I. Note that, in this case, it is also possible to cumulatively add the increases in the mean values Im of amounts of current I successively acquired from right after the time tX of start of rise of the mean values Im of amounts of current I. Now then, if an earthquake occurs after the amounts of current I start to rise, as shown in FIG. 9 by the solid line Z, the sum value $\Sigma I$ of the increases of the mean values Im of amounts of current I will continue to rise. If no earthquake occurs after the mean values Im of amounts of current I start to rise, the increases in the mean values Im of amounts of current I become minus, so as shown in FIG. 9 by the broken line, the sum value $\Sigma I$ of the increases of the mean values Im of amounts of current I rises once, then falls. Therefore, in this embodiment according to the present invention, whether an earthquake will occurred is judged by whether the sum value $\Sigma I$ of the increases of the mean values Im of amounts of current I after a fixed time after the mean values Im of amounts of current I start to rise becomes the predetermined reference value dI or less shown in FIG. 9.

Figure 10:
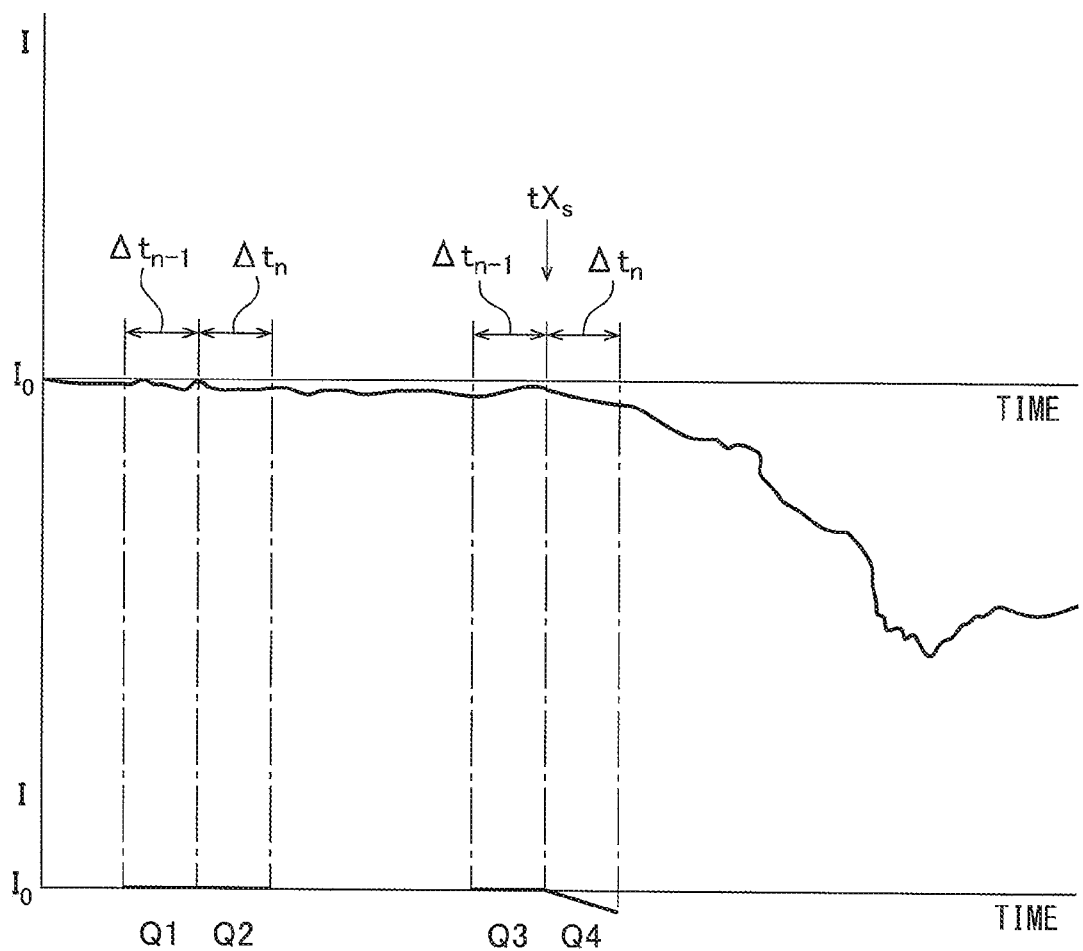
FIG. 10 is a view showing changes in amounts of current flowing through an inside of a closed loop electric circuit.

On the other hand, FIG. 10, unlike the example shown in FIG. 6, shows the case where when rupture occurs, the amounts of current I flowing through the closed loop electric circuit W detected by the detector 30 decrease. Note that, this FIG. 10 shows a view similar to FIG. 7. Therefore, the explanation of the various notations used in FIG. 10 is believed unnecessary, so the explanation of these notations will be omitted. In the case shown in FIG. 10 as well, if a fine crack 3 starts to form in the rock layer 2, that is, if quasi-static fracture starts, the amounts of current I flowing through the closed loop electric circuit W first continue to fluctuate by a fine value. Next, near the time tXs of FIG. 10, they start to fall. After that, the amounts of current I flowing through the closed loop electric circuit W rapidly decrease and rupture occurs. Therefore, in this case, if possible to detect the time tXs at which the amounts of current I flowing through the closed loop electric circuit W start to fall, it becomes possible to predict an earthquake.

Now then, in the case shown in FIG. 10 as well, before the amounts of current I start to decrease due to an earthquake, as will be understood by the approximation straight line $Q_3$ of FIG. 10, the slope $K_{n-1}$ of the approximation straight line $Q_3$ becomes substantially zero. As opposed to this, if the amounts of current I start to decrease due to an earthquake, as will be understood by the approximation straight line $Q_4$ of FIG. 10, the slope $K_n$ of the approximation straight line $Q_4$ becomes larger. Therefore, at this time, the difference $\Delta K$ ($=K_n-K_{n-1}$) between the slope $K_n$ of the approximation straight line $Q_4$ and the slope $K_{n-1}$ of the approximation straight line $Q_3$ becomes minus and the absolute value of the difference $\Delta K$ becomes greater. In this case, in FIG. 10, when the start time tXs of the fixed time $\Delta t_n$ spent for finding the approximation straight line $Q_4$ matches the time tXs of start of fall of the amount of current I, the absolute value of the difference $\Delta K$ ($=K_n-K_{n-1}$) of the slope $K_n$ of the approximation straight line $Q_4$ and the slope $K_{n-1}$ of the approximation straight line $Q_3$ becomes greatest. At this time, the absolute value of the difference $\Delta K$ ($K_n-K_{n-1}$) exceeds the threshold value $\alpha$ determined from the past measurement data. Therefore, considering the case shown in FIG. 7 and FIG. 10, in the first embodiment according to the present invention, when the absolute value of the difference $\Delta K$ ($=K_n-K_{n-1}$) exceeds the threshold value $\alpha$, the start time tXs of the fixed time $\Delta t_n$ spent for finding the approximation straight line $Q_4$ is made the time tX of start of rise of the amounts of current I or the time tX of start of fall of the amounts of current I.

Now then, in the case shown in FIG. 10 as well, when it is judged that the mean values Im of amounts of current I have started to fall, the decreases in the mean values Im of amounts of current I successively acquired from when it is judged that the mean values Im of amounts of current I have started to fall are cumulatively added and the sum value $\Sigma I$ of the decreases in the mean values Im of amounts of current I is found. In this case, if an earthquake occurs after the amounts of current I start to fall, the sum value E of the decreases in the mean values Im of amounts of current I continues to fall. If no earthquake occurs after the mean values Im of amounts of current I have started to fall, the mean values Im of amounts of current I change in the increasing direction, so the sum value $\Sigma I$ of the decreases in the mean values Im of amounts of current I decreases once, then increases. Therefore, in this embodiment according to the present invention, it is judged whether an earthquake will occur by whether the sum value $\Sigma I$ of the decreases in the mean values in of amounts of current I has become a predetermined reference value −dI shown in FIG. 9 or more after a fixed time after the mean values Im of amounts of current I start to decrease.

Figure 11:
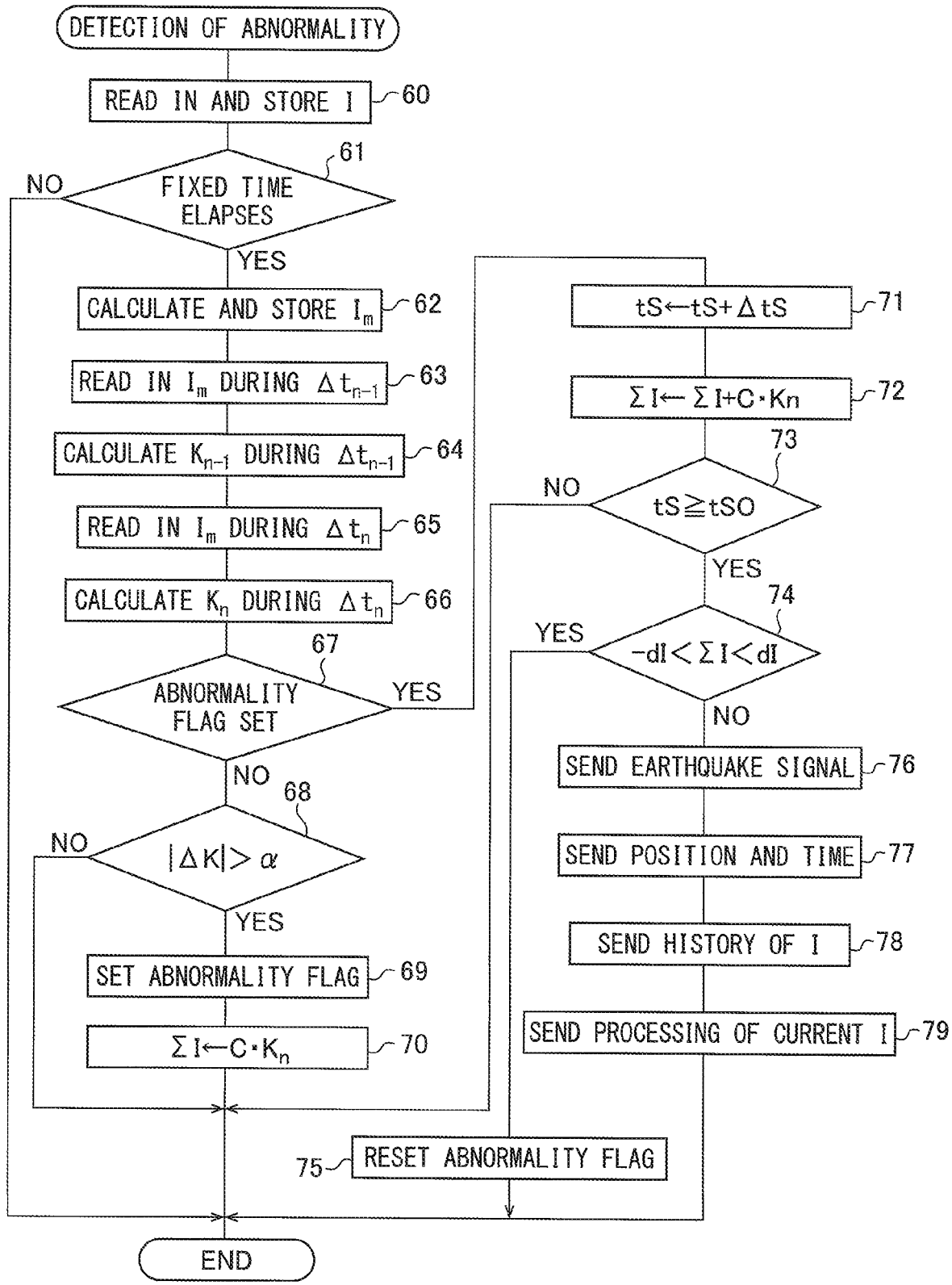
FIG. 11 is a flow chart for detecting an abnormality.

FIG. 11 shows the routine for detection of an abnormality performed at the processing device 40 of FIG. 4 for detecting the occurrence of an abnormality foreshadowing an earthquake. This routine for detection of an abnormality is performed by interruption every fixed time, for example, every 4 msec. Referring to FIG. 11, first, at step 60, amounts of current I flowing through the closed loop electric circuit W detected by the ammeter 39 are read and the read amounts of current I are stored inside the memory 45. Next, at step 61, it is judged whether the fixed time $\Delta ts$ has elapsed, for example, whether 10 seconds have elapsed. When 10 seconds have not elapsed, the processing cycle is ended. As opposed to this, when it is judged that 10 seconds have elapsed, the routine proceeds to step 62 where the mean value Im of the amounts of current I is calculated and the calculated mean value of amounts of current I is stored in the memory 45. Next, the routine proceeds to step 63.

At step 63, from among the mean values Im of the amounts of current I stored in the memory 45, the mean value Im of amounts of current I within the fixed time $\Delta t_{n-1}$ explained with reference to FIG. 8 is read in. Next, at step 64, an approximation straight line approximating the changes in the mean value Im of amounts of current I within the fixed time $\Delta t_{n-1}$ is found using the least square method, and the slope $K_{n-1}$ of this approximation straight line is calculated. Next, at step 65, from among the mean values Im of the amount of current I stored in the memory 45, the mean value Im of amounts of current I within the fixed time $\Delta t_n$ explained with reference to FIG. 8 is read in. Next, at step 66, an approximation straight line approximating the change in the mean value Im of amounts of current I within the fixed time $\Delta t_n$ is found using the least square method, and the slope $K_n$ of this approximation straight line is calculated.

Next, at step 67, it is judged if an abnormality flag showing that an abnormality has occurred foreshadowing an earthquake is set. When it is judged that the abnormality flag is not set, the routine proceeds to step 68. At step 68, it is judged if the absolute value of the difference $\Delta K$ ($=K_n-K_{n-1}$) of the calculated slope $K_n$ and slope $K_{n-1}$ exceeds the threshold value $\alpha$. When it is judged that the absolute value of the difference $\Delta K$ ($=K_n-K_{n-1}$) does not exceed the threshold value $\alpha$, the processing cycle ends. As opposed to this, when it is judged that the absolute value of the difference $\Delta K$ ($=K_n-K_{n-1}$) exceeds the threshold value $\alpha$, the routine proceeds to step 69 where the abnormality flag is set. Next, the routine proceeds to step 70 where the initial value of the increase or decrease $C \cdot K_n$ (C is constant) of the mean value Im of amounts of current I is made $\Sigma I$. Next, the processing cycle is ended. If the abnormality flag is set, at the next processing cycle, the routine proceeds from step 67 to step 71 where a fixed time $\Delta ts$ is added to an elapsed time tS. Note that, the initial value of this elapsed time tS is made zero. Therefore, this elapsed time tS expresses the elapsed time from when it is judged that the absolute value of the difference $\Delta K$ ($=K_n-K_{n-1}$) exceeds the threshold value $\alpha$.

Next, at step 72, the increase or decrease $C \cdot K_n$ (C is constant) of the mean value Im of amounts of current I is added to the sum value $\Sigma I$ of the amounts of increases or decreases of the mean values Im of amounts of current I. Next, at step 73, it is judged if the elapsed time tS exceeds a predetermined fixed time tSO, for example, 3 minutes. When the elapsed time tS does not exceed the predetermined constant time tSO, the processing cycle is ended. As opposed to this, when the elapsed time LS exceeds the predetermined constant time tSO, the routine proceeds to step 74 where it is judged if the sum value $\Sigma I$ of the increases of the mean values Im of amounts of current I becomes smaller than a predetermined reference value dI or if the sum value D of the decreases in the mean values Im of amounts of current I becomes larger than the predetermined reference value −dI, that is, if the sum value $\Sigma I$ of the increases or decreases in the mean values Im of amounts of current I becomes between the predetermined reference value dI and the predetermine reference value −dI. When the sum value ΣI of the increases or decreases in the mean values Im of amounts of current I becomes between the predetermined reference value dI and the predetermine reference value −dI, it is judged that an earthquake will not occur and the routine proceeds to step 75 where the abnormality flag is reset. Next, the processing cycle is ended. If the abnormality flag is reset, occurrence of an abnormality foreshadowing an earthquake continues to be detected.

As opposed to this, when at step 74 it is judged that the sum value ΣI of the increases or decreases in the mean values Im of amounts of current I does not become between the predetermined reference value dI and the predetermine reference value −dI, the routine proceeds to step 76 where an instruction to send various information relating to an earthquake is sent to the communication device 42. That is, at step 76, an instruction to send an earthquake signal showing that an earthquake will occur is sent to the communication device 42, then, at step 77, an instruction to send information relating to an identification signal unique to the electrochemical corrosion protection system 30, for example, the latitude and longitude of the position of setting the electrochemical corrosion protection system 30, and information relating to time such as the current time and time projected until the earthquake, is sent to the communication device 42. Next, at step 78, an instruction to send information relating to the history of changes of the closest mean value Im of amounts of current I stored in the memory 45 is sent to the communication device 42. Next, at step 79, a send instruction to send the current mean value Im of amounts of current I at short time intervals in real time is sent to the communication device 42.

Figure 12:
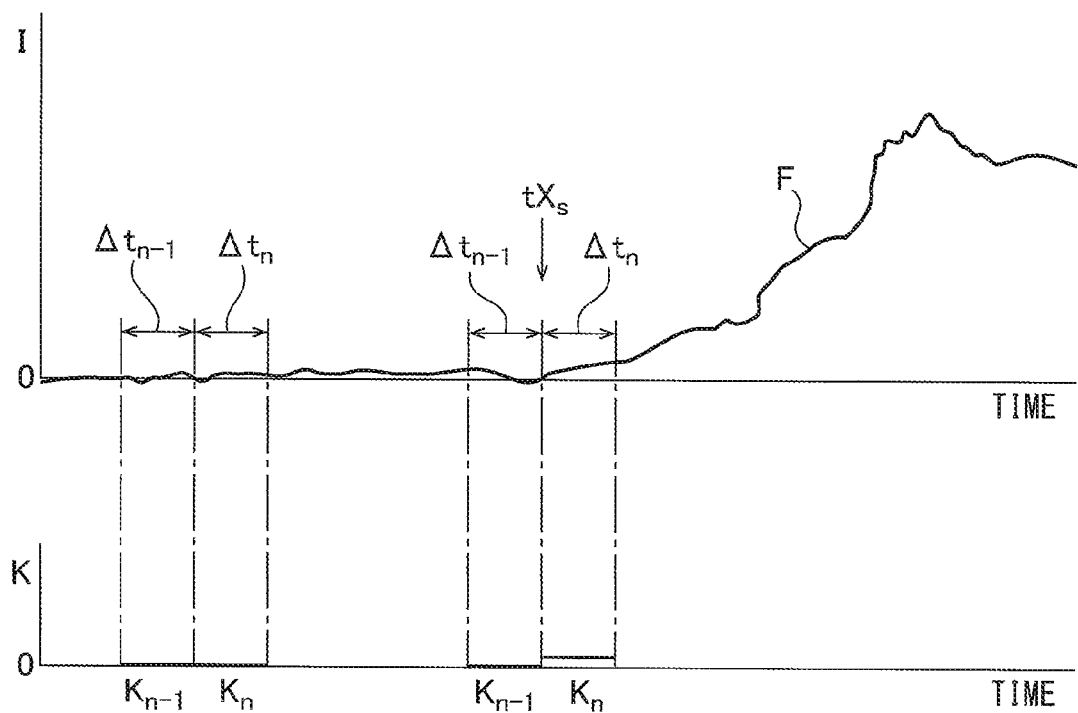
FIG. 12 is a view showing changes in amounts of current flowing through an inside of a closed loop electric circuit.

FIG. 12 shows a modification of the embodiment shown in FIG. 7 and FIG. 10 for finding the time tX of start of rise of the mean values Im of amounts of current I and the time tX of start of fall of the amounts of current I. In the modification shown in FIG. 12, as values of $K_{n-1}$ and $K_n$, instead of the slope of the approximation straight line for the mean value Im of amounts of current I within the fixed time period $\Delta t_{n-1}$ and the slope of the approximation straight line for the mean value Im of amounts of current I within the fixed time period $\Delta t_n$, the mean value Im of amounts of current I within the fixed time period $\Delta t_{n-1}$ and the mean value Im of amounts of current I within the fixed time period $\Delta t_n$ are used. In this modification as well, it is possible to use the routine for detection of an abnormality shown in FIG. 11 to detect the occurrence of an abnormality foreshadowing an earthquake.

Figure 13:
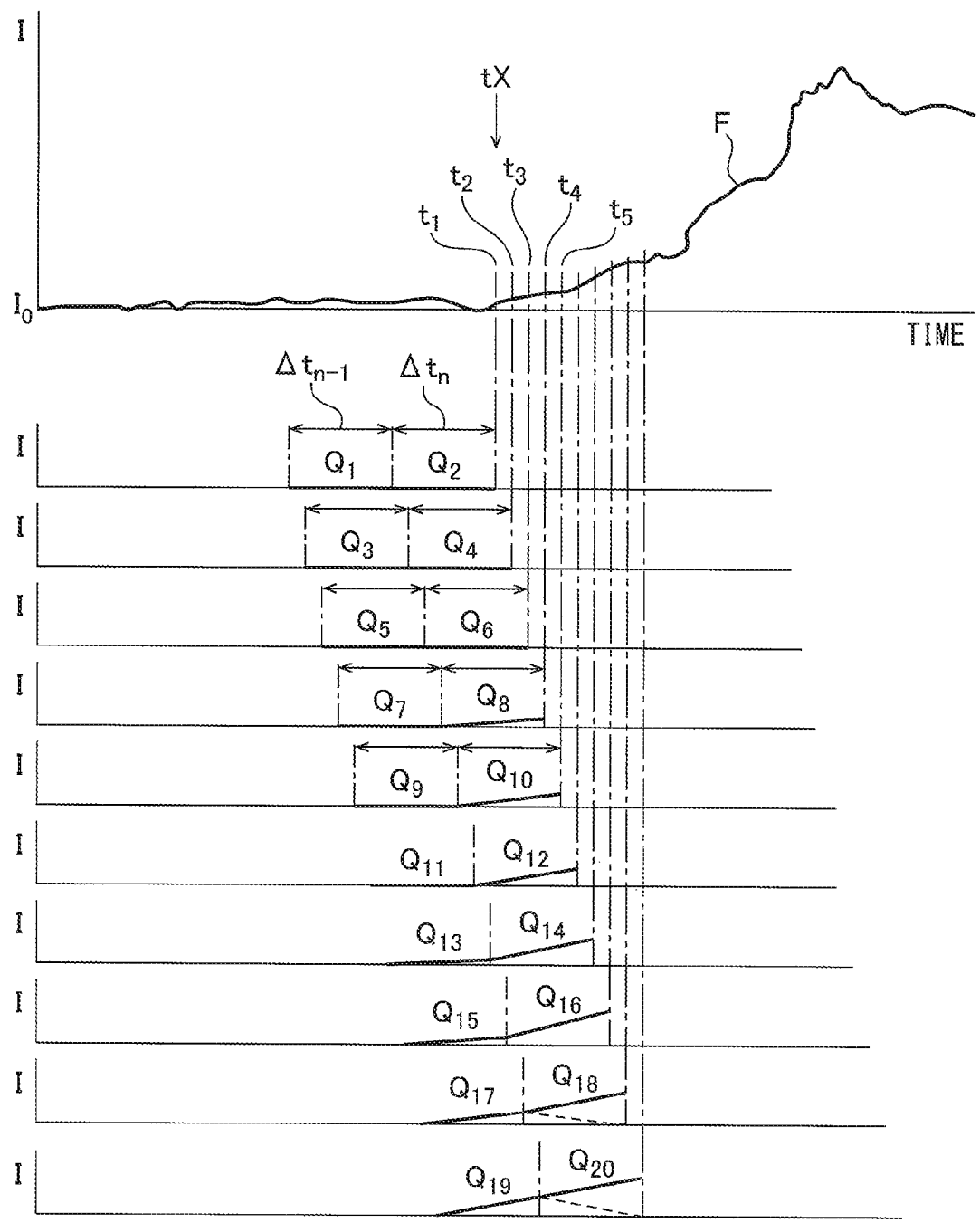
FIG. 13 is a view showing changes in approximation straight lines.

Next, referring to FIG. 13 and FIG. 14, a second embodiment of the present invention configured to prevent mistaken judgment of occurrence of an earthquake will be explained. First, if explaining FIG. 13, the curve F shown in FIG. 13 is the same as the curve F shown in FIG. 9. Further, Q1, Q2 . . . Q19, Q20 in FIG. 13 show approximation straight lines when approximating changes in the mean values Im of amounts of current I in consecutive preset fixed times $\Delta t_{n-1}$, $\Delta t_n$. Further, in FIG. 13, tX shows the time of start of rise of the mean values Im of amounts of current I. In this second embodiment as well, in the same way as the first embodiment, the mean value Im of amounts of current I flowing through the closed loop electric circuit W is calculated every 10 seconds. When the mean values Im of amounts of current I are acquired, the difference $\Delta K$ (=$K_n - K_{n-1}$) is calculated based on the mean value Im of amounts of current I in the period from when acquiring the mean value Im of amounts of current I to before the fixed time period $\Delta t_n$+fixed time period $\Delta t_{n-1}$.

The changes in the approximation straight lines Q1, Q2 . . . Q19, and Q20 when resulting in rupture after the mean values Im of amounts of current I start to rise are shown in FIG. 13 by the solid lines. As will be understood from the changes in the approximation straight lines Q1, Q2 . . . Q19, and Q20 shown by the solid lines in FIG. 13, when the mean values Im of amounts of current I start to rise, the value of the difference $\Delta K$ ($K_n - K_{n-1}$) becomes the threshold value α or more. After the mean values Im of amounts of current I start to rise, the difference between the slope $K_n$ within the time $\Delta t_n$ and the slope $K_{n-1}$ within the time $\Delta t_{n-1}$ becomes smaller. Therefore, when the mean values Im of amounts of current I start to rise, then rupture results, the value of the difference $\Delta K$ (=$K_n - K_{n-1}$) temporarily becomes the threshold value α or more, then is maintained at a small value.

On the other hand, the changes in the approximation straight lines Q1, Q2 . . . Q19, and Q20 when rupture does not result after the mean values Im of amounts of current I start to rise are shown by the broken lines in FIG. 13. In this case, the mean values Im of amounts of current I first rise, but a while after starting to rise, start to fall. Therefore, as will be understood from the changes in the approximation straight lines Q1, Q2 . . . Q19, and Q20 shown in FIG. 13 by the broken lines, when not resulting in rupture after the mean values Im of amounts of current I start to rise, starting from the time tX of start of rise of the mean values Im of amounts of current I and on, the value of the difference $\Delta K$ (=$K_n - K_{n-1}$) is maintained once at the threshold value α or more, then gradually decreases and, for example, becomes minus α or less.

On the other hand, when not resulting in rupture after the mean values Im of amounts of current I start to fall, unlike the case shown in FIG. 13, starting from the time tX of start of fall of the mean values Im of amounts of current I and on, the value of the difference $\Delta K$ (=$K_n - K_{n-1}$) is maintained once at smaller than minus α, then gradually increases and, for example, becomes more than the threshold value α. Therefore, in this second embodiment, when the value of the difference $\Delta K$ (=$K_n - K_{n-1}$) becomes more than the threshold value α within a certain time, for example, 3 minutes, after the mean values Im of amounts of current I start to fall, it is judged that no earthquake will occur.

Figure 14:
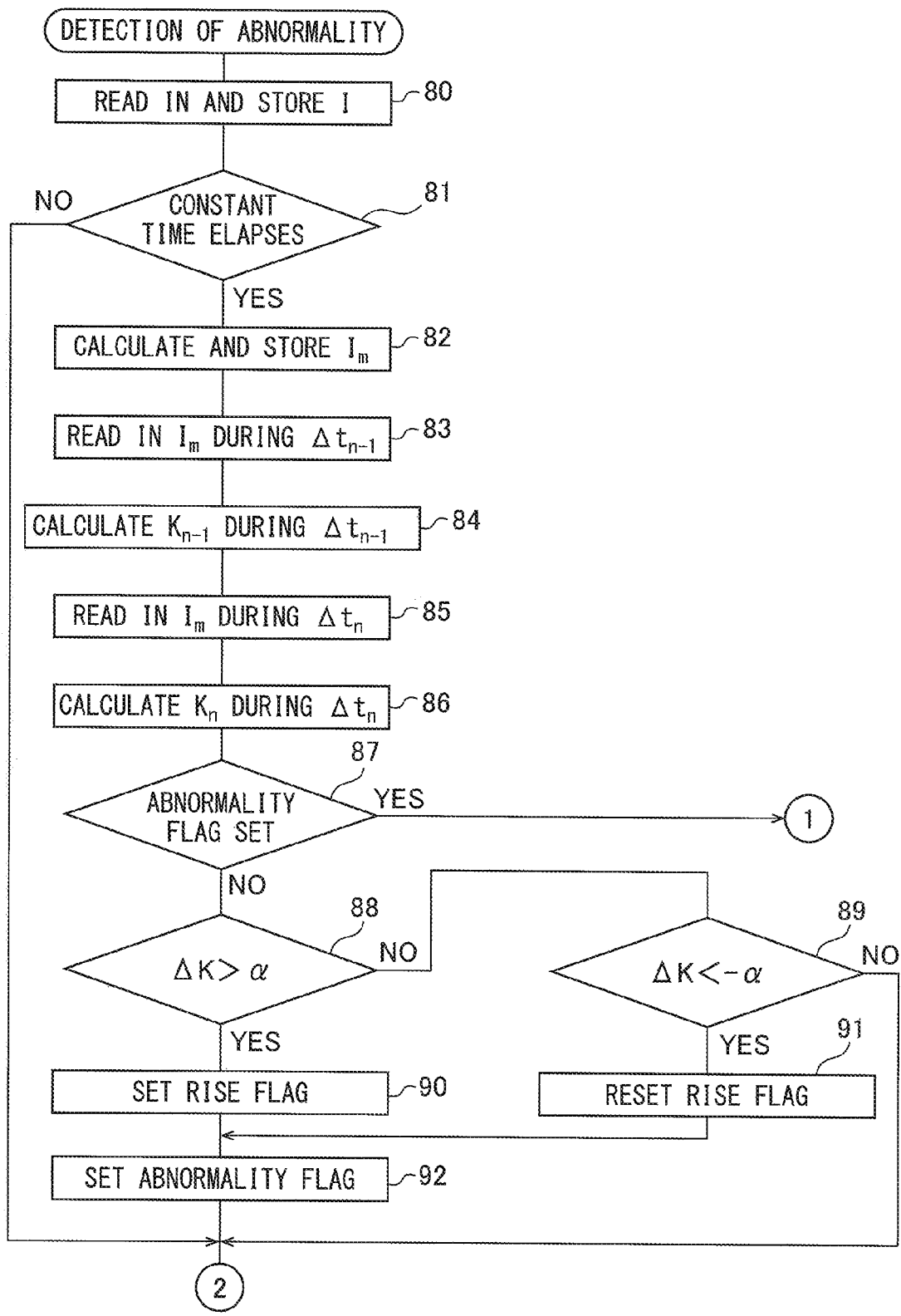
FIG. 14 is a flow chart for detecting an abnormality.
Figure 15:
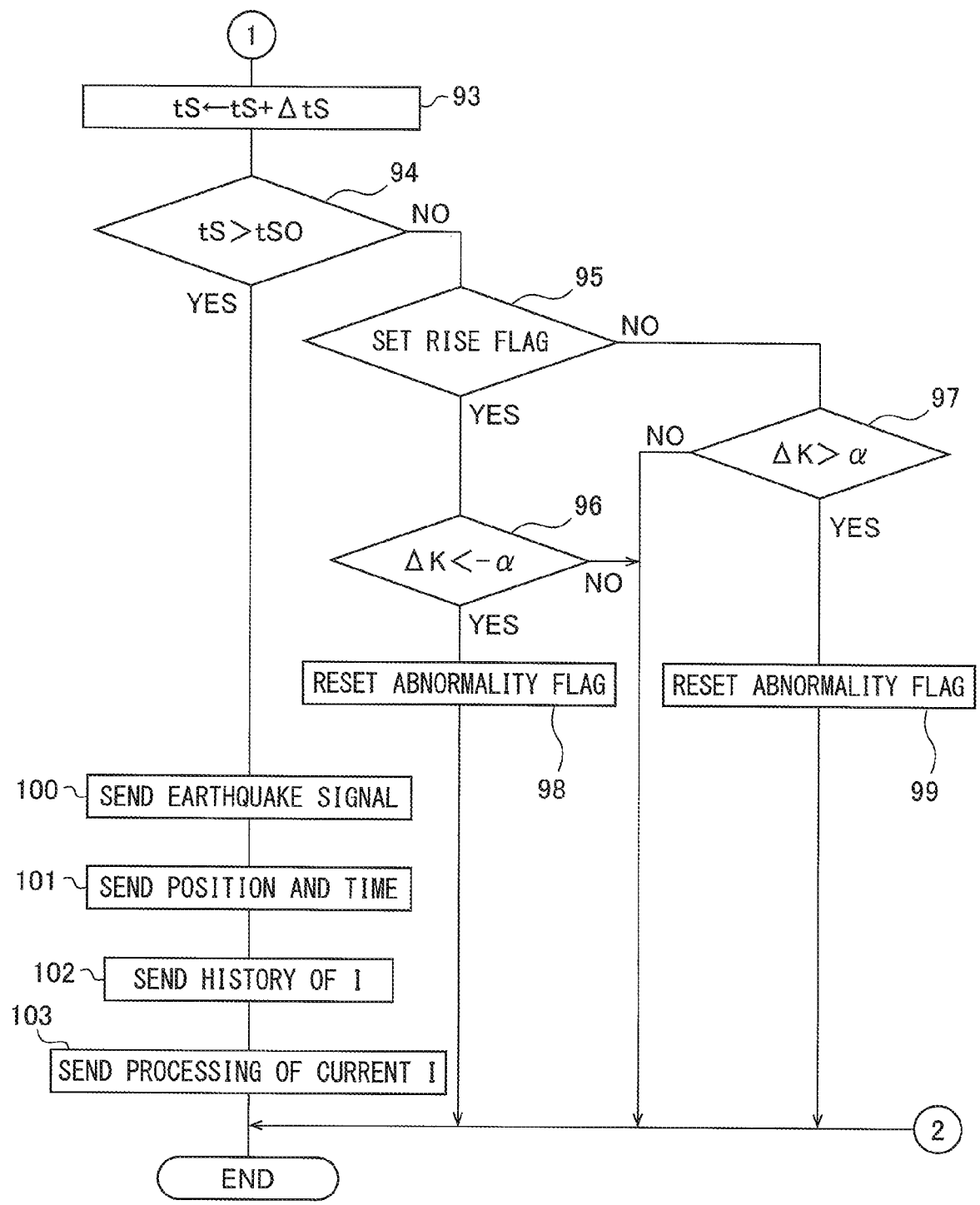
FIG. 15 is a flow chart for detecting an abnormality.

FIG. 14 and FIG. 15 show a routine for detection of an abnormality performed at the processing device 40 of FIG. 4 for working this second embodiment. This routine for detection of an abnormality is performed by interruption every fixed time, for example, every 4 msec. Note that, steps 80 to 87 in the routine shown in FIG. 14 and FIG. 15 are the same as steps 60 to 67 in the routine shown in FIG. 11.

That is, referring to FIG. 14, first, at step 80, amounts of current I flowing through the closed loop electric circuit W detected by the ammeter 39 are read and the read amounts of current I are stored inside the memory 45. Next, at step 81, it is judged whether the constant time $\Delta ts$ has elapsed, for example, whether 10 seconds have elapsed. When 10 seconds have not elapsed, the processing cycle is ended. As opposed to this, when it is judged that 10 seconds have elapsed, the routine proceeds to step 82 where the mean value Im of amounts of current I is calculated and the calculated mean value Im of amounts of current I is stored in the memory 45. Next, the routine proceeds to step 83.

At step 83, from among the mean values Im of the amounts of current I stored in the memory 45, the mean value Im of amounts of current I within the fixed time $\Delta t_{n-1}$ explained with reference to FIG. 8 is read in. Next, at step 84, the approximation straight line approximating the changes in the mean value Im of amounts of current I in the fixed time $\Delta t_{n-1}$ is found using the least square method and the slope $K_{n-1}$ of this approximation straight line is calculated. Next, at step 85, from among the mean values Im of the amount of current I stored in the memory 45, the mean value Im of amounts of current I within the fixed time $\Delta t_n$ explained with reference to FIG. 8 is read in. Next, at step 86, the approximation straight line approximating the change of the mean value Im of amounts of current I in the fixed time $\Delta t_n$ is found using the least square method and the slope $K_n$ of this approximation line is calculated.

Next, at step 87, it is judged if an abnormality flag showing an abnormality has occurred foreshadowing an earthquake is set. When it is judged that the abnormality flag is not set, the routine proceeds to step 88. At step 88, it is judged if the difference $\Delta K$ ($=K_n-K_{n-1}$) between the calculated slope $K_n$ and the calculated slope $K_{n-1}$ exceeds the threshold value $\alpha$. When it is judged that the difference $\Delta K$ ($=K_n-K_{n-1}$) does not exceed the threshold value $\alpha$, the routine proceeds to step 89 where it is judged if the difference $\Delta K$ ($=K_n-K_{n-1}$) between the calculated slope $K_n$ and the calculated slope $K_{n-1}$ is smaller than minus $\alpha$. When the difference $\Delta K$ ($=K_n-K_{n-1}$) is not smaller than minus $\alpha$, the processing cycle is ended.

On the other hand, when at step 88 it is judged that the difference $\Delta K$ ($=K_n-K_{n-1}$) exceeds the threshold value $\alpha$, the routine proceeds to step 90 where a rise flag showing that the amount of current I is rising is set. Next, the routine proceeds to step 92 where the abnormality flag is set, then the processing cycle is ended. On the other hand, when at step 89 it is judged that the difference $\Delta K$ ($=K_n-K_{n-1}$) is smaller than minus $\alpha$, the routine proceeds to step 91 where the rise flag showing that the amount of current I is rising is reset. Next, the routine proceeds to step 92 where the abnormality flag is set, then the processing cycle is ended. If the abnormality flag is set, at the next processing cycle, the routine proceeds to step 87 to step 93 where a fixed time $\Delta ts$ is added to an elapsed time tS. Note that, the initial value of this elapsed time tS is made zero. Therefore, this elapsed time tS shows the elapsed time from when it is judged that the difference $\Delta K$ ($=K_n-K_{n-1}$) exceeds the threshold value $\alpha$ or from when it is judged that the difference $\Delta K$ ($=K_n-K_{n-1}$) is smaller than minus $\alpha$.

Next, at step 94, it is judged if the elapsed time tS has passed a predetermined fixed time tSO, for example, 3 minutes. When the elapsed time tS has not passed the predetermined fixed time tSO, the routine proceeds to step 95 where it is judged if the rise flag showing that the amount of current I is rising is set. When the rise flag is set, the routine proceeds to step 96 where it is judged if the difference $\Delta K$ ($=K_n-K_{n-1}$) becomes smaller than minus $\alpha$. When the difference $\Delta K$ ($=K_n-K_{n-1}$) becomes smaller than minus $\alpha$, it is judged that no earthquake will occur and the routine proceeds to step 98 where the abnormality flag is reset. Next, the processing cycle is ended. If the abnormality flag is reset, the occurrence of an abnormality foreshadowing an earthquake continues to be monitored for.

As opposed to this, when at step 95 it is judged that the rise flag is not set, the routine proceeds to step 97 where it is judged if the difference $\Delta K$ ($=K_n-K_{n-1}$) exceeds the threshold value $\alpha$. When the difference $\Delta K$ ($=K_n-K_{n-1}$) exceeds the threshold value $\alpha$, it is judged that no earthquake will occur and the routine proceeds to step 99 where the abnormality flag is reset. Next, the processing cycle is ended. If the abnormality flag is reset, the occurrence of an abnormality foreshadowing an earthquake continues to be monitored for. On the other hand, when at step 94 it is judged that the elapsed time tS has passed the predetermined fixed time tSO, the routine proceeds to step 100 where an instruction to send various information relating to an earthquake is sent to the communication device 42.

That is, at step 100, an instruction to send an earthquake signal showing an earthquake will occur is issued to the communication device 42, then, at step 101, an instruction to send information relating to an identification signal unique to the electrochemical corrosion protection system 30, for example, the latitude and longitude of the position of setting the electrochemical corrosion protection system 30 and information relating to time such as the current time and the time projected until the earthquake, is sent to the communication device 42. Next, at step 102, an instruction to send information relating to the history of change of the nearest mean value Im of amounts of current I stored in the memory 45 is sent to the communication device 42. Next, at step 103, a send instruction for sending the current mean value Im of amounts of current I in real time at short time intervals is sent to the communication device 42.

Figure 16:
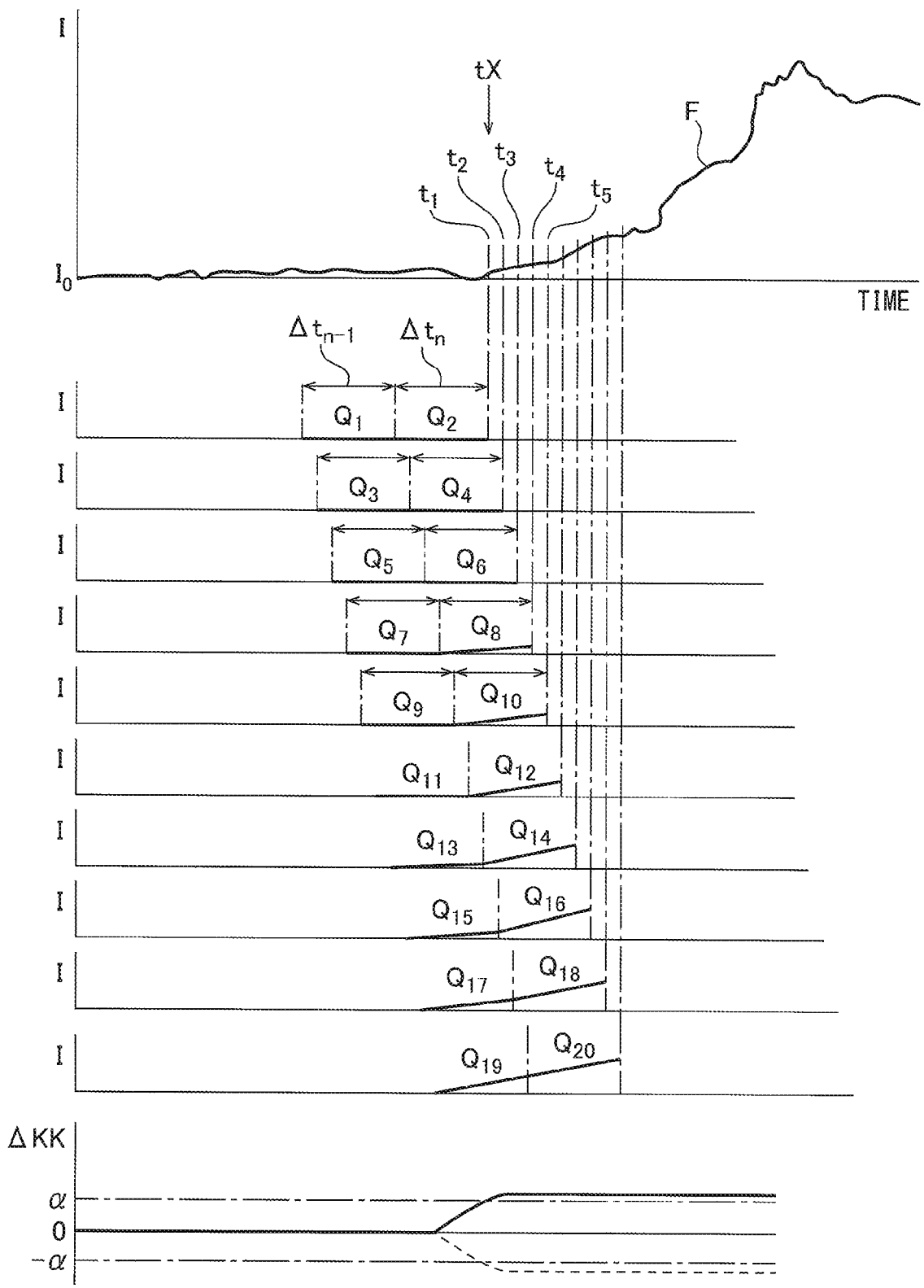
FIG. 16 is a view showing changes in approximation straight lines.

Next, referring to FIG. 16 to FIG. 18, a third embodiment of the present invention designed to prevent mistaken judgment of occurrence of an earthquake will be explained. First, if explaining FIG. 16, the curve F shown in FIG. 16 is the same as the curve F shown in FIG. 9. Further, Q1, Q2 . . . Q19, and Q20 in FIG. 16 show approximation straight lines when approximating changes in the mean values Im of amounts of current I in consecutive predetermined fixed time periods $\Delta t_{n-1}$ and $\Delta t_n$. Further, in FIG. 16, tX shows the time of start of rise of the mean values Im of amounts of current I. In this third embodiment as well, in the same way as the first embodiment and second embodiment, the mean value Im of amounts of current I flowing through the closed loop electric circuit W is calculated every 10 seconds. When the mean value Im of amounts of current is acquired, the difference $\Delta K$ ($=K_n-K_{n-1}$) is calculated based on the mean value Im of amounts of current I in the period from the time from when the mean value Im of amounts of current I is acquired to before the fixed time period $\Delta t_n$+ fixed time period $\Delta t_{n-1}$.

Further, in the same way as FIG. 13, FIG. 16 shows by the solid line the change of the approximation straight lines Q1, Q2 . . . Q19, and Q20 when rupture results after the absolute values of the mean values Im of amounts of current I start to rise. In this way, when rupture results after the absolute values of the mean values Im of amounts of current I start to rise, as explained above, the value of the difference $\Delta K$ ($=K_n-K_{n-1}$) temporarily becomes the threshold value $\alpha$ or more, then is maintained at a small value. As opposed to this, when rupture results after the mean values Im of amounts of current I start to rise, the slope $K_n$ in the time $\Delta t_n$ is maintained at a fixed slope or more from the time tX of start of rise of the mean values Im of amounts of current I and on.

In this third embodiment, to find the change in the slope $K_n$ in the time period $\Delta t_n$ from the time tX of start of rise of the mean values Im of amounts of current I and on, the slope $K_{n-1}$ in the time period $\Delta t_n$ in the time tX of start of rise of the mean values Im of amounts of current I is made the reference value $K_0$, that is, in the example shown in FIG. 16, the slope $K_{n-1}$ of the approximation straight line Q9 is made the reference value $K_0$, the difference $\Delta KK$ ($=K_n-K_0$) between the slope $K_n$ and the reference value $K_0$ in the different times $\Delta t_n$ starting from the time tX of start of rise of the mean value Im of amounts of current I is calculated. If the mean values Im of amounts of current I continue to rise starting from the time tX of start of rise of the mean value Im of amounts of current I and on, the slope $K_n$ will be maintained at a constant slope or more and therefore the value of the difference ΔKK (=$K_n$-$K_0$) will be maintained at a constant value or more. In FIG. 16, this difference ΔKK (=$K_n$-$K_0$) is shown.

When resulting in rupture after the mean values Im of amounts of current I start to rise, as shown in FIG. 16 by the solid line, starting from the time tX of start of rise of the mean values Im of amounts of current I and on, the value of the difference ΔKK (=$K_n$-$K_0$) is maintained at a constant value, for example, near the threshold value α. As opposed to this, when not resulting in rupture after the mean values Im of amounts of current I start to rise, starting from the time tX of start of rise of the mean values Im of amounts of current I and on, after a while, the value of the difference ΔKK (=$K_n$-$K_0$) falls below the threshold value α. Therefore, in the third embodiment, if the value of the difference ΔKK (=$K_n$-$K_0$) continuously is maintained for a fixed time, for example, 5 minutes or more, near the threshold value α after the mean values Im of amounts of current I start to rise, it is judged that an earthquake will occur, while if the value of the difference ΔKK (=$K_n$-$K_0$) falls within a fixed time, for example, 5 minutes or less, below the threshold value α after the mean values Im of amounts of current I start to rise, it is judged that an earthquake will not occur.

On the other hand, when resulting in rupture after the means value Im of amounts of current I start to fall, as shown in FIG. 16 by the broken line, starting from the time tX of start of fall of the mean values Im of amounts of current I and on, the value of the difference ΔKK (=$K_n$-$K_0$) is maintained at a constant value, for example, near minus α. As opposed to this, when not resulting in rupture after the mean values Im of amounts of current I start to fall, when some time elapses after the time tX of start of fall of the mean values Im of amounts of current I, the value of the difference ΔKK (=$K_n$-$K_0$) rises more than minus α. Therefore, in the third embodiment, if, after the mean values Im of amounts of current I start to fall, the value of the difference ΔKK (=$K_n$-$K_0$) is maintained for a fixed time, for example, 5 minutes or more, continuously near minus α, it is judged that an earthquake will occur, while after the mean values Im of amounts of current I start to fall, the value of the difference ΔKK (=$K_n$-$K_0$) rises within a fixed time, for example, within 5 minutes, more than minus α, it is judged that an earthquake will not occur.

Figure 17:
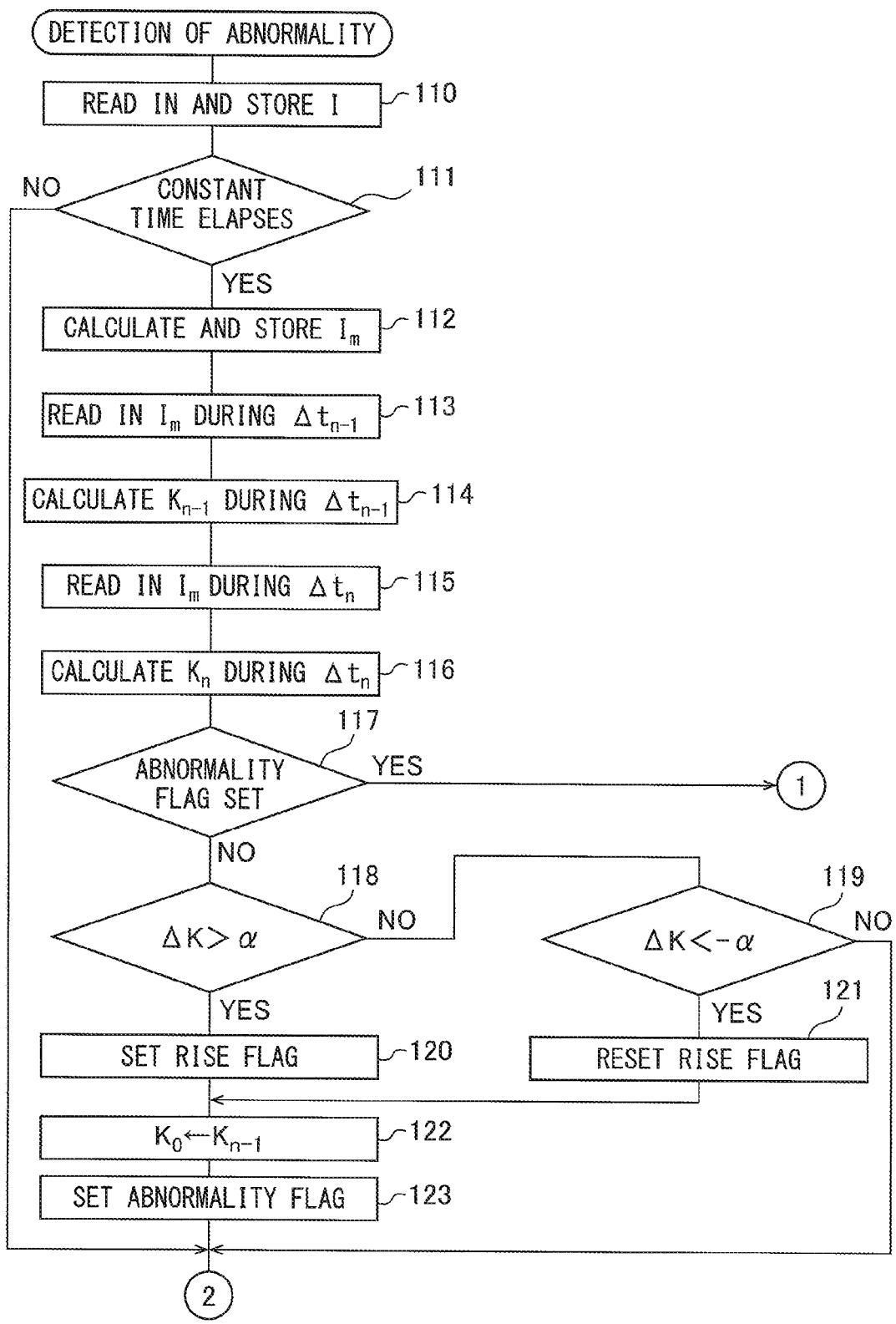
FIG. 17 is a flow chart for detecting an abnormality.
Figure 18:
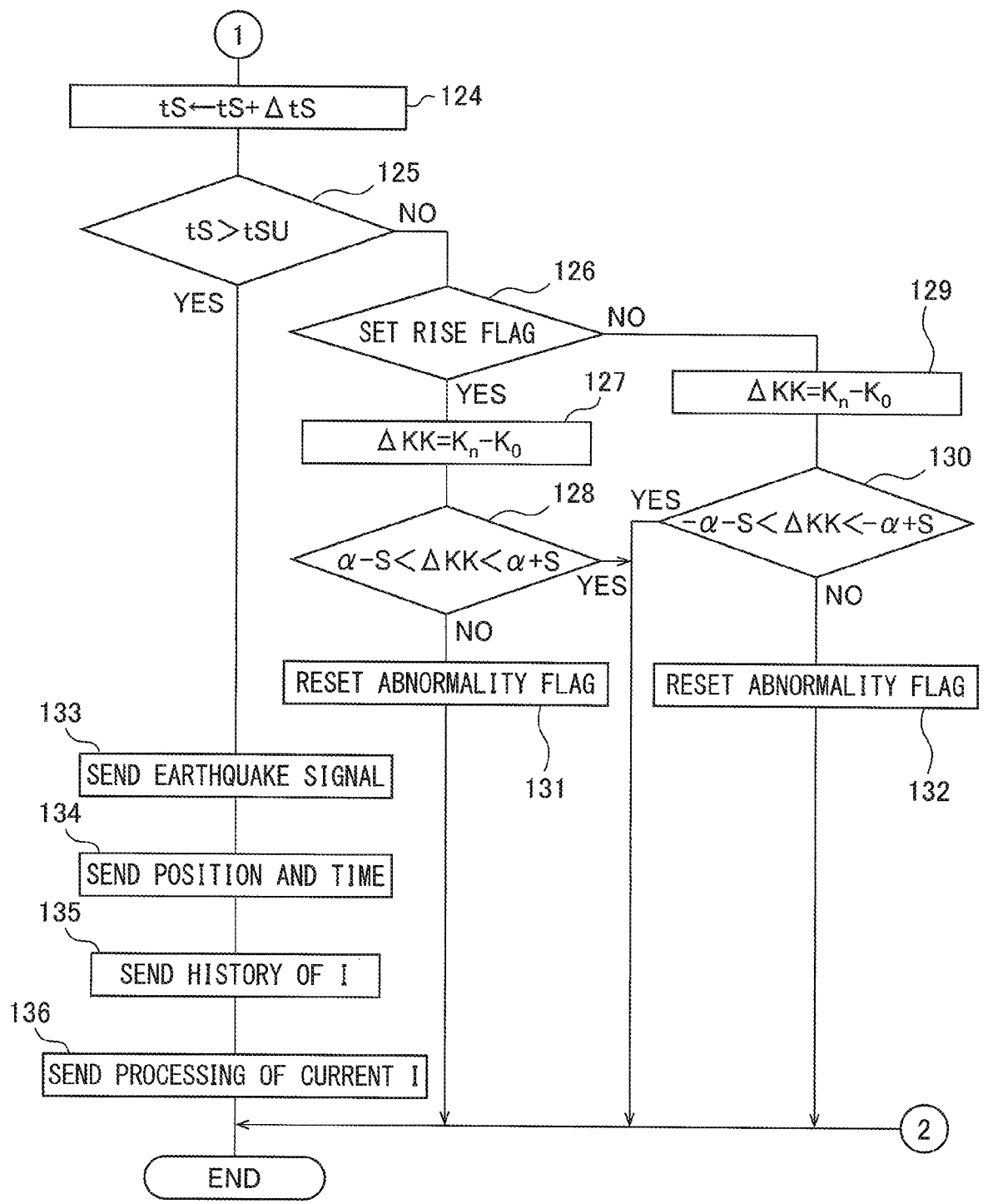
FIG. 18 is a flow chart for detecting an abnormality.

FIG. 17 and FIG. 18 show a routine for detection of an abnormality performed in a processing system 40 of FIG. 4 for working this third embodiment. This routine for detection of an abnormality is performed by interruption every fixed time, for example, every 4 msec. Note that, steps 110 to 121 in the routine shown in FIG. 17 and FIG. 18 are the same as steps 80 to 91 in the routine shown in FIG. 14.

That is, referring to FIG. 17, first, at step 110, amounts of current I flowing through the closed loop electric circuit W detected by the ammeter 39 are read and the read amounts of current I is stored in the memory 45. Next, at step 111, it is judged whether the fixed time Δts has elapsed, for example, whether 10 seconds have elapsed. When 10 seconds have not elapsed, the processing cycle is ended. As opposed to this, when it is judged that 10 seconds have elapsed, the routine proceeds to step 112 where the mean value Im of amounts of current I is calculated and the calculated mean value Im of amounts of current I is stored in the memory 45. Next, the routine proceeds to step 113.

At step 113, from among the mean values Im of the amounts of current I stored in the memory 45, the mean value Im of amounts of current I within the fixed time $\Delta t_{n-1}$ explained with reference to FIG. 8 is read in. Next, at step 114, the approximation straight line approximating the changes in the mean value Im of amounts of current I in the fixed time $\Delta t_{n-1}$ is found using the least square method and the slope $K_{n-1}$ of this approximation straight line is calculated. Next, at step 115, from among the mean values Im of the amount of current I stored in the memory 45, the mean value Im of amounts of current I within the fixed time $\Delta t_n$ explained with reference to FIG. 8 is read in. Next, at step 116, the approximation straight line approximating the change of the mean value Im of amounts of current I in the fixed time $\Delta t_n$ is found using the least square method and the slope $K_n$ of this approximation straight line is calculated.

Next, at step 117, it is judged if an abnormality flag showing that an abnormality has occurred foreshadowing an earthquake is set. When it is judged that the abnormality flag is not set, the routine proceeds to step 118. At step 118, it is judged if the difference ΔK (=$K_n$-$K_{n-1}$) between the calculated slope $K_n$ and the calculated slope $K_{n-1}$ exceeds the threshold value α. When it is judged that the difference ΔK (=$K_n$-$K_{n-1}$) does not exceeds the threshold value α, the routine proceeds to step 119 where it is judged if the difference ΔK (=$K_n$-$K_{n-1}$) between the calculated slope $K_n$ and the calculated slope $K_{n-1}$ is smaller than minus α. When the difference ΔK (=$K_n$-$K_{n-1}$) is not smaller than minus α, the processing cycle is ended.

On the other hand, when at step 118 it is judged that the difference ΔK (=$K_n$-$K_{n-1}$) exceeds the threshold value α, the routine proceeds to step 120 where a rise flag showing that the amount of current I is rising is set. Next, the routine proceeds to step 122 where the slope $K_{n-1}$ calculated at step 114 is made the reference value $K_0$. Next, the routine proceeds to step 123 where the abnormality flag is set, then the processing cycle is ended. On the other hand, when at step 119 it is judged that the difference ΔK (=$K_n$-$K_{n-1}$) is smaller than minus α, the routine proceeds to step 121 where the rise flag showing that the amount of current I is rising is reset. Next, the routine proceeds to step 122 where the slope $K_{n-1}$ calculated at step 114 is made the reference value $K_0$. Next, the routine proceeds to step 123 where the abnormality flag is set, then processing cycle is ended. If the abnormality flag is set, at the next processing cycle, the routine proceeds from step 117 to step 124 where a fixed time period Δts is added to the elapsed time tS. Note that, the initial value of this elapsed time tS is made zero. Therefore, this elapsed time tS shows the elapsed time from when it is judged that the difference ΔK (=$K_n$-$K_{n-1}$) has exceeded the threshold value α or when it is judged that the difference ΔK (=$K_n$-$K_{n-1}$) is smaller than minus α.

Next, at step 125, it is judged if the elapsed time tS has passed a predetermined fixed time tSU, for example, 5 minutes. When the elapsed time tS has not passed the predetermined fixed time tSU, the routine proceeds to step 126 where it is judged if the rise flag showing the amount of current I is rising is set. When the rise flag is set, the routine proceeds to step 127 where the difference ΔKK (=$K_n$-$K_0$) is calculated, and then the routine proceeds to step 128 where it is judged if the difference ΔKK (=$K_n$-$K_0$) is between the value α−s of the threshold value α minus a small fixed value s and the value α+s of the threshold value α plus the small fixed value s, that is, if the difference ΔKK (=$K_n$-$K_0$) is a value close to the threshold value α. When the difference ΔKK (=$K_n$-$K_0$) is not between α−s and α+s, it is judged that an earthquake will not occur and the routine proceeds to step 131 where the abnormality flag is reset. Next, the processing cycle is ended. If the abnormality flag is reset, monitoring for any abnormality foreshadowing an earthquake is continued.

As opposed to this, when at step 126 it is judged that the rise flag is not set, the routine proceeds to step 129 where the difference $\Delta KK$ $(=K_n-K_0)$ is calculated, and then the routine proceeds to step 130 where it is judged if the difference $\Delta KK$ $(=K_n-K_0)$ is between the value $-\alpha-s$ of minus $\alpha$ minus a small fixed value "s" and the value $-\alpha+s$ of minus $\alpha$ plus a small fixed value "s", that is, if the difference $\Delta KK$ $(=K_n-K_0)$ is a value near minus $\alpha$. When the difference $\Delta KK$ $(=K_n-K_0)$ is not between $-\alpha-s$ and $-\alpha+s$, it is judged that no earthquake will occur and the routine proceeds to step 132 where the abnormality flag is reset. Next, the processing cycle is ended. If the abnormality flag is reset, the occurrence of an abnormality foreshadowing an earthquake continues to be monitored for. On the other hand, when at step 125 it is judged that the elapsed time tS has passed the predetermined fixed time tSU, that is, when the difference $\Delta KK$ $(=K_n-K_0)$ has been maintained between $\alpha-s$ and $\alpha+s$ for more than the fixed time tSU or when the difference $\Delta KK$ $(=K_n-K_0)$ has been maintained between $-\alpha-s$ and $-\alpha+s$ for more than the fixed time tSU, the routine proceeds to step 133 where an instruction to send various information relating to an earthquake is sent to the communication device 42.

That is, at step 133, an instruction to send an earthquake signal showing that an earthquake will occur is sent to the communication device 42, then at step 134, an instruction to send information relating to a unique identification signal of the electrochemical corrosion protection system 30, for example, the latitude and longitude of the position of setting of the electrochemical corrosion protection system 30 and information relating to time such as the current time and time projected until the earthquake occurs, is sent to the communication device 42. Next, at step 135, an instruction to send information relating to the history of change of the nearest mean value Im of amounts of current I stored in the memory 45 is sent to the communication device 42. Next, at step 136, a send instruction for sending the current mean value Im of amounts of current I in real time at short time intervals is sent to the communication device 42.

Now then, as explained above, if occurrence of an abnormality foreshadowing an earthquake is detected, an instruction for sending various information relating to the earthquake is sent from the processing device 40 set in the electrochemical corrosion protection system 30 to the communication device 42. In this case, in the embodiment according to the present invention, an earthquake is predicted based on the various information relating to the earthquake sent from the communication device 42 in the electrochemical corrosion protection system 30. Therefore, next, an earthquake prediction system for predicting an earthquake will be simply explained.

Figure 19:
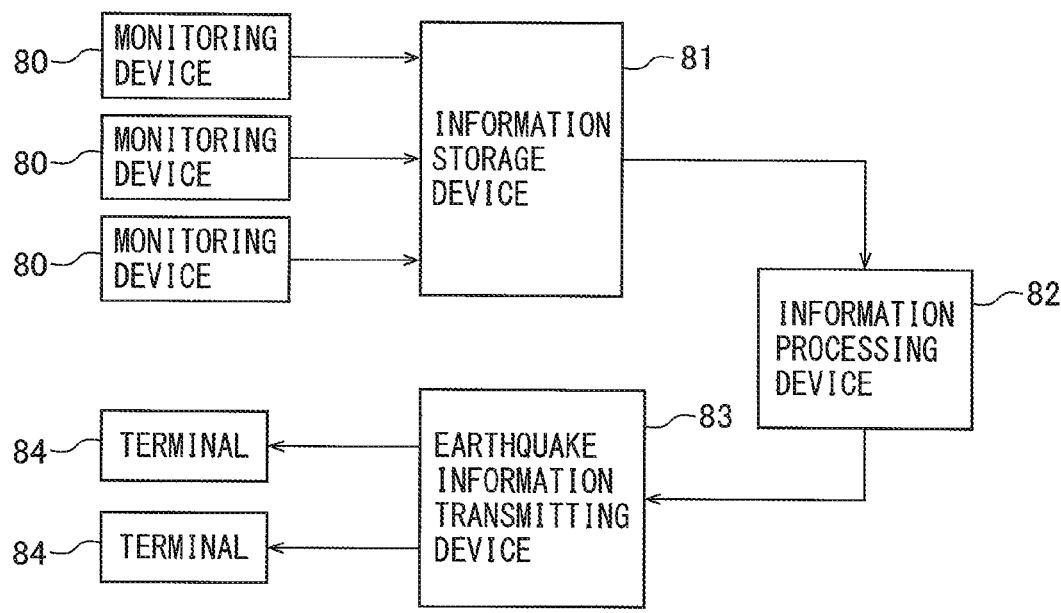
FIG. 19 is a schematic view of an earthquake prediction system.

In the earthquake prediction system according to the present invention, a plurality of electrochemical corrosion protection systems 30 for underground buried structures set dispersed geographically are utilized for predicting earthquakes. In this case, this earthquake prediction system, as shown in FIG. 19, is provided with monitoring devices 80 monitoring changes in the amounts of current I flowing through closed loop electric circuits W for electrochemical corrosion protection in the electrochemical corrosion protection systems 30, an information storage device 81 collecting and storing information relating to changes in the amounts of current I monitored by the monitoring devices 80 and information on positions of the monitoring devices 80, an information processing device 82 statistically processing the stored information and outputting information relating to earthquake prediction, and an earthquake information transmitting device 83 transmitting the output information relating to earthquake prediction. The information relating to earthquake prediction transmitted from the earthquake information transmitting device 83 is received by mobile phones or other terminals 84.

In this case, each monitoring device 80 in FIG. 19 corresponds to the ammeter 39 and the processing device 40 in the example shown in FIG. 4. In the information storage device 81, information relating to the changes in the amounts of current I monitored by the large number of monitoring devices 80 arranged dispersed geographically and information on the positions of the large number of monitoring devices 80 arranged dispersed geographically are collected and stored in the memory provided inside the information storage device 81. In the information processing device 82, the location of occurrence of the earthquake, the magnitude of the earthquake, the time of occurrence of the earthquake, etc. are predicted based on the various information stored in the memory of the information storage device 81. These predicted location of occurrence of the earthquake, predicted magnitude of the earthquake, predicted time of occurrence of the earthquake, etc. are sent from the earthquake information transmitting device 83 to the mobile phones and other terminals 84. For example, if taking as an example the embodiment shown in FIG. 17 and FIG. 18, when it is judged at a plurality of monitoring devices 80 in close proximity to each other that the difference $\Delta KK$ $(=K_n-K_0)$ has been maintained between $\alpha-s$ and $\alpha+s$ for more than the fixed time tSU or the difference $\Delta KK$ $(=K_n-K_0)$ has been maintained between $-\alpha-s$ and $-\alpha+s$ for more than the fixed time tSU, it is predicted that an earthquake of the greatest magnitude will occur at the region in which these plurality of monitoring devices 80 are set and an earthquake warning is immediately issued.

Figure 20:
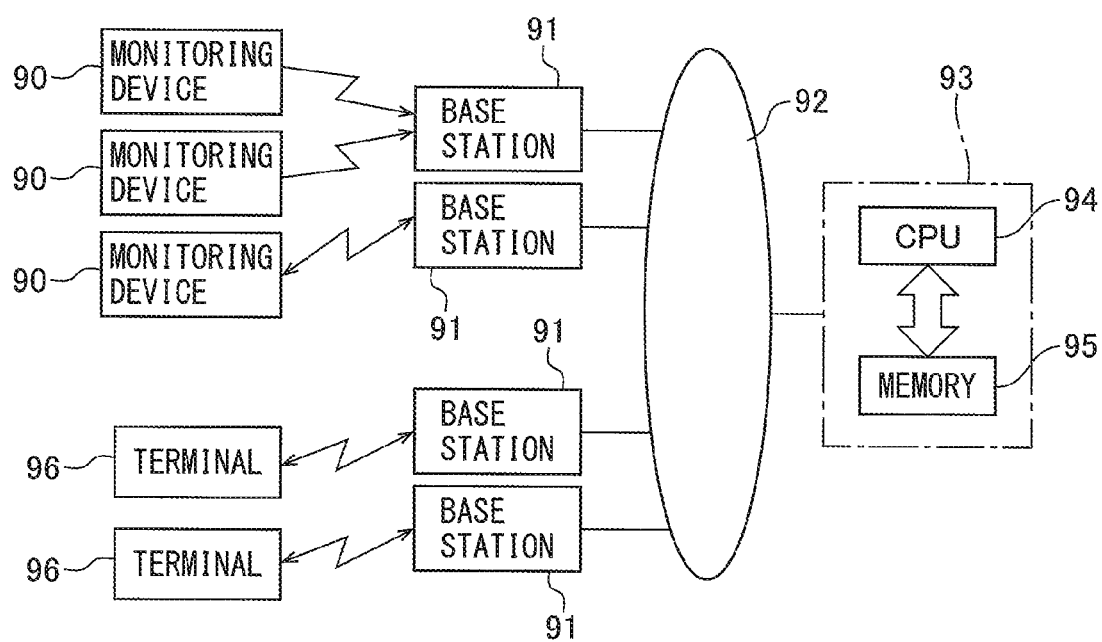
FIG. 20 is a schematic view of an earthquake prediction system.

On the other hand, FIG. 20 is a schematic view of an earthquake prediction system utilizing an existing mobile phone network. Note that, each monitoring device 90 shown in FIG. 20, like the example shown in FIG. 19, corresponds to the ammeter 39 and the processing device 40. In this earthquake prediction system, information relating to changes in the amounts of current I monitored by the large number of monitoring devices 90 arranged dispersed geographically and information on the positions of the large number of monitoring devices 90 arranged dispersed geographically are sent to the base station 91. The groups of information received at the base station 91 are sent through the mobile phone network 92 to the server 93.

As shown in FIG. 20, the server 93 is provided with a microprocessor (CPU) 94 and a storage device, that is, a memory 95. Information sent from the base station 91 through the mobile phone network 92 to the server 93, that is, information relating to the changes in the amounts of current I monitored by the large number of monitoring devices 90 and information of the positions of the large number of monitoring devices 90 are stored in the memory 95. Inside the server 93, the location of occurrence of the earthquake, the magnitude of the earthquake, the time of occurrence of the earthquake, etc. are predicted based on the various information stored in the memory 95. These predicted location of occurrence of the earthquake, predicted magnitude of the earthquake, predicted time of occurrence of the earthquake, etc. are sent from the server 93 through the mobile phone network 92 and base station 91 to mobile phones or other terminals 96.

The invention claimed is:

1. An earthquake prediction method for predicting an earthquake by utilizing a plurality of electrochemical corrosion protection systems for underground buried structures installed geographically dispersed, each electrochemical corrosion protection system comprising an underground buried structure to be protected from electrochemical corrosion, and an electrode or an anode arranged separated a distance from the underground buried structure in ground, each electrochemical corrosion protection system forming a closed loop electric circuit of a corrosion prevention current which flows through a lead wire connecting the underground buried structure and the electrode or the anode and flows through the ground between the underground buried structure and the electrode or the anode, the earthquake prediction method comprising:

detecting changes in amounts of current flowing through the closed loop electric circuits for electrochemical corrosion protection formed in the electrochemical corrosion protection systems; and predicting the earthquake based on the detected changes in the amounts of current.

2. The earthquake prediction method according to claim 1, wherein the plurality of electrochemical corrosion protection systems are outside power supply type electrochemical corrosion protection systems.

3. An earthquake prediction system for predicting an earthquake by utilizing a plurality of electrochemical corrosion protection systems for underground buried structures installed geographically dispersed, each electrochemical corrosion protection system comprising an underground buried structure to be protected from electrochemical corrosion, and an electrode or an anode arranged separated a distance from the underground buried structure in ground, each electrochemical corrosion protection system forming a closed loop electric circuit of a corrosion prevention current which flows through a lead wire connecting the underground buried structure and the electrode or the anode and flows through the ground between the underground buried structure and the electrode or the anode, the earthquake prediction system comprising:

monitoring devices monitoring changes in amounts of current flowing through closed loop electric circuits for electrochemical corrosion protection formed in the plurality of electrochemical corrosion protection systems, information storage devices collecting and storing information relating to the changes in the amounts of currents monitored by the monitoring devices and positional information of the monitoring devices, information processing devices statistically processing the stored information and outputting information relating to earthquake prediction, and earthquake information transmitting devices transmitting the information relating to the earthquake prediction.

\* \* \* \* \*